(12) United States Patent
Ramdatt et al.

(10) Patent No.: US 8,063,140 B2
(45) Date of Patent: Nov. 22, 2011

(54) MOISTURE-CURABLE, GRAFT-MODIFIED RESIN COMPOSITION, PROCESS FOR ITS MANUFACTURE AND PROCESS FOR BONDING SUBSTRATES EMPLOYING THE RESIN COMPOSITION

(75) Inventors: Philbert E. Ramdatt, New York, NY (US); Roy M. Griswold, Ballston Spa, NY (US); Eric R. Pohl, Mount Kisco, NY (US)

(73) Assignee: Momentive Performance Materials Inc., Albany, NY (US)

( * ) Notice: Subject to any disclaimer, the term of this patent is extended or adjusted under 35 U.S.C. 154(b) by 944 days.

(21) Appl. No.: 11/818,020

(22) Filed: Jun. 13, 2007

(65) Prior Publication Data
US 2008/0311419 A1    Dec. 18, 2008

(51) Int. Cl.
*C08F 255/02*    (2006.01)
*C08F 263/04*    (2006.01)
*C08L 51/00*    (2006.01)

(52) U.S. Cl. .............. 525/71; 525/63; 525/72; 525/100; 525/342

(58) Field of Classification Search .................. 524/262, 524/263, 264; 525/55, 100, 101, 102, 127, 525/128, 131, 185, 191, 193, 222, 240, 242, 525/244, 288, 326.1, 342, 330.3, 474, 63, 525/70, 71, 72, 477; 528/26, 28
See application file for complete search history.

(56) References Cited

U.S. PATENT DOCUMENTS

| | | | |
|---|---|---|---|
| 3,951,888 A | 4/1976 | Isayama et al. | |
| 3,971,751 A | 7/1976 | Isayama et al. | |
| 4,187,212 A | 2/1980 | Zinke et al. | |
| 4,491,650 A | 1/1985 | Rizk et al. | |
| 5,461,110 A | 10/1995 | Arthurs et al. | |
| 5,478,427 A | 12/1995 | Huver et al. | |
| 5,661,200 A | 8/1997 | Boudreaux et al. | |
| 5,990,257 A | 11/1999 | Johnston et al. | |
| 6,140,393 A | 10/2000 | Bomal et al. | |
| 6,140,447 A | 10/2000 | Gay et al. | |
| 6,197,912 B1 | 3/2001 | Huang et al. | |
| 6,212,354 B1 | 4/2001 | Garzolini et al. | |
| 6,245,834 B1 | 6/2001 | Bomal et al. | |
| 6,271,331 B1 | 8/2001 | Gay et al. | |
| 6,355,317 B1 | 3/2002 | Reid et al. | |
| 2004/0180155 A1 | 9/2004 | Nguyen-Misra | |
| 2004/0181007 A1 | 9/2004 | Acevedo et al. | |
| 2006/0173121 A1 | 8/2006 | Tamai | |
| 2008/0125539 A1* | 5/2008 | Mack | 524/588 |
| 2008/0221245 A1* | 9/2008 | Huang et al. | 524/263 |

FOREIGN PATENT DOCUMENTS

| | | |
|---|---|---|
| EP | 1462500 | 9/2004 |
| JP | 56159265 | 12/1981 |
| WO | WO97/15619 | 5/1997 |
| WO | WO97/48778 | 12/1997 |
| WO | WO99/54386 | 10/1999 |
| WO | WO 2006/053724 A1 | 5/2006 |

OTHER PUBLICATIONS

Goutille, et al.; "Crosslinking in the melt of EVA using tetrafunctional silane: gel time from capillary rheometry", Polymer, vol. 44, pp. 3165-3171, 2003.
XP002491377—Database WPI Week 198203; Thomson Scientific, London, 1982.

* cited by examiner

*Primary Examiner* — Irina S Zemel
*Assistant Examiner* — Jeffrey Lenihan
(74) *Attorney, Agent, or Firm* — Dominick G. Vicari; Joseph S. Ostroff

(57) ABSTRACT

A moisture-curable, graft-modified resin composition includes at least one thermoplastic polymer (i) and at least one silyl group containing polymer (ii) possessing at least one hydrolyzable silyl group that is bonded to the polymer through a linking group containing at least one heteroatom selected from the group consisting of oxygen and nitrogen, each of polymers (i) and (ii) having grafted thereto at least one same or different silane (iii) which, prior to being grafted, possesses at least one reactive carbon-carbon unsaturated bond.

39 Claims, No Drawings

MOISTURE-CURABLE, GRAFT-MODIFIED RESIN COMPOSITION, PROCESS FOR ITS MANUFACTURE AND PROCESS FOR BONDING SUBSTRATES EMPLOYING THE RESIN COMPOSITION

BACKGROUND OF THE INVENTION

The present invention relates to moisture-curable resin compositions, to methods for their manufacture and to processes for bonding substrates, e.g., metal sheets and panels, employing moisture-curable resin compositions.

Prior art hot melt adhesives and sealants are typically thermoplastic polymers containing tackifiers, fillers and other additives. These hot melt compositions are solid at room temperature but flow at elevated temperatures. Because the compositions are made up primarily of an uncrosslinked thermoplastic component, they are often of low modulus and are susceptible to creep and cold flow under static loads making them unsuitable for many applications where strength of the adhesive joint is critical such as that required for bonding together heavy metal sheets in the construction of truck trailers. The weight on the joints, combined with vibration and environmental heat and moisture resulting from exposure to sun in hot and humid climates, can cause adhesive joints made with known hot melt adhesives to distort and eventually fail.

Moisture-curable hot melt adhesive compositions are known in the art which partially address the foregoing deficiencies. These compositions often contain a thermoplastic component such as a chlorinated paraffin or plasticizer, styrene block copolymer, butyl rubber or poly-α-olefin, and a silylated polyurethane based upon polyols or polyamines containing polybutadiene, polyester, acrylic, polycarbonate or polythioether backbones. Moisture-curable hot melt adhesive compositions contain a continuous phase of the thermoplastic component in which the silylated urethane is dispersed and crosslinked during the application process. The thermoplastic continuous phase, however, remains susceptible to creep and cold flow when placed under static loads. Where the silylated polyurethane component of a moisture-curable holt melt resin composition is incompatible with its thermoplastic component, little if any crosslinking will occur between the two thus giving rise to phase separation of the cured material. Single component and moisture-curable hot melt compositions may therefore exhibit insufficient strength and modulus due to the thermoplastic polymer debonding from the silylated polyurethane under static loads. The silylated polyurethane phase may also be too elastomeric and too low in modulus to provide the desired levels of bond strength.

Hot melt adhesive compositions often exhibit poor "open time." Open time is used herein to refer to the "working time" of an adhesive which begins at the point when an adhesive is applied to a first substrate until it is bonded to a second substrate. It is critical that the adhesive present on the first substrate be joined to the second substrate during this time. If the open time is exceeded before the first substrate is joined to the second substrate, the adhesive will lose its ability to bond the second substrate. Longer adhesive open times permit greater flexibility in manufacturing bonded articles and the use of automated apparatus such as robotic assembly machinery.

Silylated acrylic polymers are known in the art, e.g., as disclosed in U.S. Pat. No. 4,491,650, where they are used as primers. However, these polymers are unsuitable for use as adhesives due to their brittleness.

Published U.S. Patent Application No. 2006/0173121 describes a moisture-curable composition containing silylated polyoxyalkylene polymer, copolymers of methacryloxysilane, acrylic acid alkyl ester monomers and an ionic surfactant. However, the glass transition temperatures for these copolymers must be lower than 0° C. for flexibility. These moisture-curable compositions therefore have low modulus and as such may be unsuitable for applications in which high bond strength is required.

There remains a need in the industry for moisture-curable resin compositions for use, inter alia, in hot-melt adhesives and sealants which are solid at room temperature, flowable at elevated temperature and cure to high modulus products that do not exhibit significant cold flow or creep under static loads. The present invention, as described more fully herein, provides such compositions.

SUMMARY OF THE INVENTION

In accordance with the present invention, there is provided a moisture-curable, graft-modified resin composition which comprises at least one thermoplastic polymer (i) and at least one silyl group containing polymer (ii) possessing at least one hydrolyzable silyl group that is bonded to polymer (ii) through a linking group containing at least one heteroatom selected from the group consisting of oxygen and nitrogen, each of polymers (i) and (ii) having grafted thereto at least one same or different silane (iii) which, prior to being grafted, possesses at least one reactive carbon-carbon unsaturated bond.

Further in accordance with the invention herein, a process for preparing a moisture-curable, graft modified resin composition is provided which comprises grafting at least one same or different silane (iii) possessing at least one reactive carbon-carbon unsaturated bond onto at least one thermoplastic polymer (i) and at least one silyl group-containing polymer (ii) possessing at least one hydrolyzable silyl group that is bonded to polymer (ii) through a linking group containing at least one heteroatom selected from the group consisting of oxygen and nitrogen, to provide a moisture-curable, graft-modified resin composition; and, optionally, moisture-curing the moisture-curable, graft-modified resin composition.

The moisture-curable, graft-modified resin composition of this invention is a solid at room temperature, flows at elevated temperatures, exhibits suitable open times and cures via hydrolysis and subsequent condensation to provide a high modulus resin exhibiting excellent strength, creep and adhesion properties that make the resin well suited for use, inter alia, as an adhesive or sealant for automotive and other industrial applications.

Other than in the working examples or where otherwise indicated, all numbers expressing amounts of materials, reaction conditions, time durations, quantified properties of materials, and so forth, stated in the specification and claims are to be understood as being modified in all instances by the term "about."

Each numerical range recited herein shall be understood to include all sub-ranges within that range.

Any compound, material or substance which is expressly or implicitly disclosed in the specification and/or recited in a claim as belonging to a group of structurally, compositionally and/or functionally related compounds, materials or substances shall be understood to include individual members of the group and all combinations thereof.

DETAILED DESCRIPTION OF THE INVENTION

The moisture-curable, graft-modified resin composition of the present invention is obtained by grafting unsaturated silane (iii) onto thermoplastic polymer (i) and silyl group-containing polymer (ii) under suitable grafting reaction conditions, e.g., at elevated temperature in the presence of free radical-generating agent (iv).

One embodiment of this process for preparing a moisture-curable, graft-modified resin composition of the invention herein includes the steps of:

a) heating at least one thermoplastic polymer (i) to a temperature at or above the melt temperature but not exceeding the degradation temperature thereof to provide molten thermoplastic polymer(s)(i);

b) combining molten thermoplastic polymer(s)(i) from step (a) with at least one silyl group-containing polymer (ii) possessing at least one hydrolyzable silyl group that is bonded to polymer (ii) through a linking group containing at least one heteroatom selected from the group consisting of oxygen and nitrogen to provide a substantially uniform mixture of molten thermoplastic(s) (i) and silyl group-containing polymer(s) (ii);

c) combining the substantially uniform mixture of molten thermoplastic polymer(s) (i) and silyl group-containing polymer(s) (ii) from step (b) with at least one silane (iii) possessing at least one reactive carbon-carbon unsaturated bond, and at least one free radical-generating agent (iv) under reactive-mechanical conditions to provide a moisture-curable, graft-modified resin composition; and, d) optionally, moisture-curing the moisture-curable, graft-modified resin composition from step (c).

Each of the materials employed in the foregoing process, i.e., thermoplastic polymer (i), silyl group-containing polymer (ii), unsaturated silane (iii) and free radical-generating agent (iv), as well as various kinds of optional materials (v), will now be described.

Thermoplastic Polymer (i)

Thermoplastic polymer (i) can be selected from among any of numerous polymers of the addition and condensation types inclusive of homopolymers, copolymers of two or more copolymerizable monomers and mixtures of two or more such polymers. Thermoplastic polymer (i) advantageously possesses a melt flow index of from 10 to 500 grams per 10 minutes, preferably from 150 to 450 grams per 10 minutes and more preferably from 200 to 400 grams per 10 minutes. Examples of suitable thermoplastic (ii) are as follows:

1. Polymers of monoolefins and diolefins, e.g., polypropylene, polyisobutylene, polybut-1-ene, poly-4-methylpent-1-ene, polyisoprene or polybutadiene, as well as polymers of cycloolefins, e.g., of cyclopentene or norbornene, polyethylene (optionally crosslinked), e.g., high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE). Polyolefins, i.e., the polymers of monoolefins such as those aforementioned and preferably polyethylene and polypropylene, can be prepared by such methods as radical polymerization (normally under high pressure and at elevated temperature) and catalytic polymerization employing a catalyst typically containing one or more metals of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under (1), e.g., mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, e.g., ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in (1), supra, e.g., polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, e.g., polyamides.

4. Hydrocarbon resins (for example $C_5$-$C_9$) including hydrogenated modifications thereof and mixtures of polyalkylenes and starch.

5. Polystyrene, poly(p-methylstyrene), poly(a-methylstyrene).

6. Copolymers of styrene or a-methylstyrene with dienes or acrylic derivatives, e.g., styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymer and another polymer such as a polyacrylate, a diene polymer or an ethylene/propylene/diene terpolymer; and block copolymers of styrene such as styrene/butadiene/styrene, styrene/isoprene/styrene, styrene/ethylene/butylene/styrene and styrene/ethylene/propylene/styrene.

7. Graft copolymers of styrene or a-methylstyrene such as styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under (6), e.g., the copolymer mixtures known as ABS, MBS, ASA or AES polymers.

8. Halogen-containing polymers such as polychloroprene, chlorinated rubbers, chlorinated and brominated copolymers of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds such as polyvinyl chloride, polyvinylidene chloride, polyvinyl fluoride, polyvinylidene fluoride and copolymers thereof such as vinyl chloride/vinylidene chloride, vinyl chloride/vinyl acetate or vinylidene chloride/vinyl acetate copolymers.

9. Polymers derived from α, β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under (9) with each other or with other unsaturated monomers such as acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins such as those mentioned in (1) above.

12. Homopolymers and copolymers of cyclic ethers such as polyalkylene glycols, polyethylene oxide, polypropylene oxide, and copolymers thereof with bisglycidyl ethers.

13. Polyacetals such as polyoxymethylene and those polyoxymethylenes derived from ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from the reaction of hydroxyl-terminated polyethers, polyesters or polybutadienes with aliphatic or aromatic polyisocyanates, as well as precursors thereof.

16. Polyamides and copolyamides derived from diamines and dicarboxylic acids and/or from aminocarboxylic acids or the corresponding lactams, for example polyamide 4, polyamide 6, polyamides 6/6, 6/10, 6/9, 6/12, 4/6 and 12/12, polyamide 11, polyamide 12, aromatic polyamides obtained from m-xylene diamine and adipic acid; polyamides obtained from hexamethylenediamine and isophthalic or/and terephthalic acid and with or without an elastomer as modifier, e.g., poly-2,4,4,-trimethylhexamethylene terephthalamide or poly-m-phenylene isophthalamide; block copolymers of the aforementioned polyamides with polyoletins, olefin copolymers, ionomers or chemically bonded or grafted elastomers; or with polyethers, e.g., with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Blends of the aforementioned polymers (polyblends) such as PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred thermoplastic polymers (i) include ethylene-vinyl acetate copolymers having a vinyl acetate content of from 10 to 60 weight percent and a melt index of from 10 to 500 grams per 10 minutes, and more preferably ethylene-vinyl acetate copolymers within this melt index having a vinyl acetate content of from 18 to 50 weight percent.

Representative non-limiting examples of some commercially available thermoplastic polymers (i) include atactic polypropylene copolymers available under the REXTAC series of trade designations including REXTAC RT 2535 and RT 2585 (Rexene Products Company) and EASTOFLEX series of trade designations including EASTOFLEX E1060 (Eastman Chemical Company); ethylene vinyl acetate copolymers available under the ELVAX series of trade designations including ELVAX 420 and 2609 (DuPont), and ULTRATHENE series of trade designations including ULTRATHENE 7710 (Millennium Petrochemicals); ethylene methyl acrylate copolymers available under the OPTEMA series of trade designations (Exxon Chemical Company); ethylene n-butyl acrylate copolymers available under the LOTRYL series of trade designation (Elf Atochem North America), the ESCORENE series of trade designations including ethylene vinyl acetate copolymer UL 7710 (Exxon Chemical Company) and the ENATHENE series of trade designations (Millennium Petrochemicals); ethylene n-butyl acrylate carbon monoxide terpolymers available under the ELVALOY series of trade designations (DuPont); ethylene acrylic copolymers available under the ELVALOY series of trade designations (DuPont); and, acrylic polymers available under the ELVACITE series of trade designations (ICI Acrylics).

Thermoplastic polymer(s) (i) can be present in the moisture-curable, graft-modified resin-forming composition herein in widely varying amounts, e.g., from 1 to 65, preferably from 10 to 50 and more preferably from 25 to 50, weight percent based on the weight of the entire composition.

Silyl Group-Containing Polymer (ii) Possessing at Least One Hydrolyzable Silyl Group The moisture-curable, graft-modified resin composition of the invention includes at least one silyl group-containing polymer (ii) possessing at least one hydrolyzable silyl group that is bonded to the polymer through a linking group containing at least one heteroatom selected from the group consisting of oxygen and nitrogen.

In one embodiment of the present invention, silyl group-containing polymer (ii) is represented by general Formula (1):

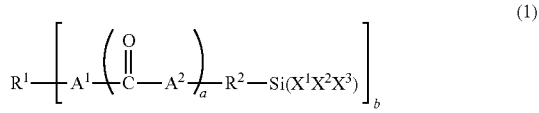
(1)

wherein:

each occurrence of $R^1$ is independently a monovalent or polyvalent organic polymer fragment having an number average molecular weight of from 500 to 25,000 grams/mole;

each occurrence of $R^2$ is independently a divalent hydrocarbyl group containing up to 12 carbon atoms selected from the group consisting of divalent alkylene, alkenylene, arenylene, arylene and aralkylene optionally containing at least one heteroatom selected from the group consisting of oxygen, nitrogen and sulfur;

each occurrence of $A^1$ is independently selected from divalent oxygen (—O—), sulfur (—S—) or substituted nitrogen of the structure $(-)_2NR^3$ wherein $R^3$ is hydrogen, alkyl, alkenyl, arenyl, aryl, aralkyl or an $-R^2SiX^1X^2X^3$ group wherein each $R^3$, other than hydrogen, contains up to 18 carbon atoms, and with the provisos that when a is 1 and $A^1$ is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or substituted nitrogen of the structure $(-)_2NR^3$ wherein $R^3$ is hydrogen, alkyl, alkenyl, arenyl, aryl, aralkyl or $-R^2SiX^1X^2X^3$ group, wherein each $R^3$, other than hydrogen, contains up to 18 carbon atoms, and with the proviso that when $A^2$ is oxygen or sulfur, then $A^1$ is $(-)_2NR^3$;

each occurrence of $X^1$ is independently selected from the group consisting of RO—, RC(=O)O—, $R_2C$=NO— and $R_2NO$— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

each occurrence of $X^2$ and $X^3$ is independently selected from the group consisting of RO—, RC(=O)O—, $R_2C$=NO—, $R_2NO$— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms; and, each occurrence of subscripts a and b is independently an integer wherein a is 0 or 1 and b is 1 to 6.

As used herein, "alkyl" includes straight, branched and cyclic alkyl groups; "alkenyl" includes any straight, branched or cyclic alkenyl group containing one or more carbon-carbon double bonds where the site of substitution can be either at a carbon-carbon double bond or elsewhere in the group; "aryl" includes any aromatic hydrocarbon from which one hydrogen atom has been removed; "aralkyl" includes any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents.

Specific examples of alkyls include, but are not limited to, methyl, ethyl, propyl and isobutyl. Specific examples of alkenyls include, but are not limited to, vinyl, propenyl, allyl, methallyl, ethylidenyl norbornane, ethylidene norbornyl, ethylidenyl norbornene and ethylidene norbornenyl. Specific examples of aryls include, but are not limited to, phenyl and naphthalenyl. Specific examples of aralkyls include, but are not limited to, benzyl and phenethyl. Specific examples of arenyls include, but are not limited to, tolyl and xylyl.

According to one embodiment of the invention, silyl group-containing polymer (ii) can be prepared from one or a mixture of polyol reactants. Mixtures of polyol reactants are often used in order to achieve specific physical properties in the moisture-cured polymer resin such as flowability, tensile strength, modulus and adhesion strength. In one embodiment, the number average molecular weight of the polyol reactant is preferably from 300 to 24,000 grams per mole and more preferably from 1,000 to 20,000 grams per mole. These polyols may contain one or more other organic functional groups such as urethane, thiourethane, urea, biuret, ester, thioester, ether, thioether, amide, and the like.

A silyl group-containing polymer (ii) containing a single silyl group can be used in combination with a silyl group-containing polymer (ii) containing two or more silyl groups in order to lower the Tg and increase the flexibility of the resulting cured resin. Polymer (ii) containing a single silyl group functions as a reactive plasticizer that becomes incorporated into the polymer network during cure. However, if the average hydroxyl functionality of the polyol mixture used for providing mixtures of polymers (ii) is too low, then the moisture-curable resin composition containing the mixture of polymers (iii) may cure poorly. It is therefore preferable to have sufficient average hydroxyl functionality in the reactant polyols such that polymers (ii) will cure in a suitable manner. The average hydroxyl functionality of the polyol reactant mixture can range from 1.6 to 6.0 hydroxyl groups per polyol molecule, preferably from 1.8 to 3.0 hydroxyl groups per polyol molecule and more preferably from 1.95 to 2.5 hydroxyl groups per polyol molecule.

Blending a low number average molecular weight polyol reactant with a high number average molecular weight polyol reactant will generally increase the modulus of the cured resin at low strains while maintaining high values for elongations at break. The number average molecular weight of the low molecular weight polyol can range from 300 to 2,000 grams per mole, preferably from 500 to 1,200 grams per mole and more preferably from 800 to 1,000 grams per mole. The number average molecular weight of the high molecular weight polyol can range from 2,000 to 24,000 grams per mole, preferably from 4,000 to 12,000 grams per mole and more preferably from 8,000 to 10,000 grams per mole. The weight ratio of low molecular weight polyol reactant to high molecular weight polyol reactant can range from 0.01 to 3, preferably from 0.05 to 1 and more preferably from 0.2 to 0.5.

Representative non-limiting examples of polyols from which polymer (ii) can be derived include hydroxyl-terminated polyalkylene oxides such as hydroxyl-terminated polypropylene oxide, hydroxyl-terminated polyethylene oxide and hydroxyl-terminated polybutylene oxide; polyoxyalkylene triols; polycaprolactone diols and triols; hydroxyl-terminated unsaturated rubbers such as hydroxyl-terminated polybutadiene copolymer; polyester diols and polyols made from saturated aliphatic diacids and diols or triols, unsaturated diacids and diols or triols, saturated polyacids and diols or aromatic diacids and diols or triols, and the like; polytetramethylene glycols; and other diols or triols which have a Tg lower than −20° C.

In one embodiment of the present invention, the polyol reactant will possess a very low level of unsaturation and therefore a correspondingly high level of functionality. Such polyols are typically prepared using metal complex catalysts for the polymerization of alkylene oxide resulting in polyols having a low level of terminal ethylenic unsaturation. In one embodiment of the present invention, the polyol reactant possesses a terminal ethylenic unsaturation of less than 0.4 milliequivalents, preferably less than 0.1 milliequivalents and more preferably less than 0.02 milliequivalents, per gram (meq/g) of polyol. The number average molecular weight of the polyols can range from 500 to 24,000 grams per mole (g/mol) and more preferably from 2000 to 12,000 grams per mole.

In another embodiment of the present invention, the polyol reactant is a hydroxyl-containing acrylate polymer. The term "hydroxyl-containing acrylate polymer" as used herein refers to pendent and/or terminal hydroxyl-functional polymers and copolymers containing at least one hydroxyl group and at least one ester group. The hydroxyl-containing polymer is prepared from one or more alpha, beta-ethylenically unsaturated carboxylic acid esters that may contain a hydroxyl group, and optionally with one or more other types of ethylenically unsaturated monomers. When the alpha, beta-ethylenically unsaturated monomer does not contain a hydroxyl group, then at least one other type of ethylenically unsaturated monomer containing a hydroxyl group must be used in the preparation of the hydroxyl-containing acrylate polymer. Among the alpha, beta-ethylenically unsaturated carboxylic acid esters are esters of acrylic acid, such as 2-hydroxyethyl acrylate, 3-hydroxypropyl acrylate, 6-hydroxyhexyl acrylate, methyl acrylate, ethyl acrylate, butyl acrylate, 2-ethylhexyl acrylate, phenyl acrylate, and the like; esters of methacrylic acid, such as 2-hydroxyethyl methacrylate, 3-hydroxypropyl methacrylate, 6-hydroxy-2-ethylhexyl methacrylate, methyl methacrylate, ethyl methacrylate, butyl methacrylate, 2-ethylhexyl methacrylate, phenyl methacrylate, and the like; the other types of ethylenically unsaturated monomers are alcohols such as allyl alcohol, methallyl alcohol, and the like; acids such as acrylic acid, methacrylic acid, 2-propenoic acid, 2-butenoic acid, 3-butenoic acid, 4-vinylbenzoic acid, and the like; vinyl compounds containing an aryl group such as styrene, 4-vinyltoluene, and the like; acrylonitrile; vinyl esters such as vinyl acetate, vinyl propanoate, vinyl benzoate, and the like; substituted ethylenically unsaturated monomers such as allyl chloride, methallyl chloride, and the like.

The hydroxyl-containing acrylate polymers of the present invention include, but are not limited to, copolymers of esters of acrylic or methacrylic acid and/or esters of methacrylic acid, and/or styrene monomers, and/or acrylonitrile monomers, and/or vinyl acetate monomers. Useful hydroxyl-containing acrylate polymers can be prepared by methods known in the art such as those disclosed in U.S. Pat. No. 4,491,650, the entire contents of which are incorporated by reference herein.

In one embodiment of the invention, the hydroxyl-containing acrylate polymer(s) is represented by general Formula (2):

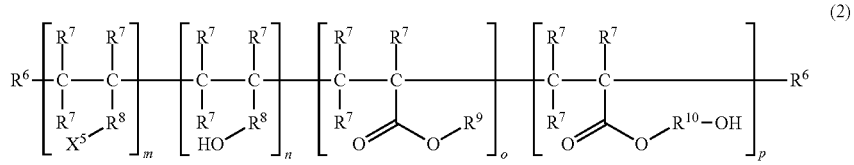

wherein:

each occurrence of $R^6$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of $R^7$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of $R^8$ is a covalent bond or divalent hydrocarbyl group of up to 12 carbon atoms selected from the group consisting of an alkylene, arenylene, arylene and aralkylene optionally containing at least one heteroatom selected from the group consisting of oxygen, nitrogen and sulfur;

each occurrence of $R^9$ is independently a monovalent hydrocarbyl group of up to 12 carbon atoms selected from the group consisting of alkyl, arenyl, aryl and aralkyl, and containing at least one heteroatom selected from the group consisting of oxygen, nitrogen and sulfur;

each occurrence of $R^{10}$ is a divalent hydrocarbyl group of up to 12 carbon atoms selected from the group consisting of an alkylene, arenylene, arylene and aralkylene optionally containing at least one heteroatom selected from the group consisting of oxygen, nitrogen and sulfur;

each occurrence of $X^5$ is independently an organo functional group selected from the group consisting of carboxyl (—C(=O)OH), cyano (—CN), hydroxyl (—OH), halo (Cl—, Br— and I—), phenyl (—$C_6H_5$) and vinyl (—C($R^5$)=$CH_2$) wherein $R^5$ has the aforestated meaning; and, each occurrence of m, n, o and p is an integer wherein m is 0 to 500, n is 0 to 500, o is 0 to 500 and p is 0 to 500, with the provisos that the sum of o and p is greater than 1 and the sum of n and p is greater than 1.

Silyl group-containing polymer (ii) can be present in the moisture-curable, graft-modified resin-forming composition herein in an amount of from 1 to 40, preferably from 2 to 30 and more preferably from 5 to 20, weight percent based on the weight of the entire composition.

Silyl group-containing polymer (ii) can be prepared by any of several synthetic process including those hereinafter described.

Synthetic Process 1: Reaction of a Polyol with a Polyisocyanate to Provide Isocyanate-Terminated Prepolymer which is then Reacted with a Hydrolyzable Silane Containing at Least One Active Hydrogen Functional Group to Provide Silyl Group-Containing Polymer (ii)

In the first step of Synthetic Process 1, one or more of the above-mentioned hydroxyl-functional polyols are converted into isocyanate-terminated prepolymer by reaction with an excess of one or more polyisocyanates, typically in the presence of catalyst, as is well known in the art. The resulting isocyanate-terminated prepolymers may be represented by general Formula (3):

wherein $R^1$ and b have the aforestated meanings and a is 1. It is understood that monovalent or polyvalent organic polymer fragment $R^1$ contains at least one urethane group as a result of the reaction of a hydroxyl group with an isocyanate group. According to one embodiment of the invention, isocyanate-terminated prepolymer is prepared by reacting diisocyanate with polyol in —NCO to —OH ratios ranging from 1.1 to 2.0, preferably from 1.4 to 1.9 and more preferably from 1.6 to 1.8.

Suitable polyisocyanates include diisocyanates such as 2,4-toluene diisocyanate, 2,6-toluene diisocyanate, mixtures of 2,4- and 2,6-toluene diisocyanate isomers, 4,4' diphenyl-methanediisocyanate, isophorone diisocyanate, dicyclohexylmethane-4,4'-diisocyanate, various liquid diphenylmethane-diisocyanates containing mixtures of 2,4- and 4,4' isomers, and the like, and mixtures thereof. In one embodiment of the present invention, the isocyanate functional monomer employed is an isophorone diisocyanate (IPDI) available from Bayer under the trade name Desmodur ID 230.

Catalysts may be used in the preparation of the isocyanate-terminated prepolymers. Suitable catalysts include metal salts and bases, e.g., bismuth salts such as bismuth trisneodecanoate and other bismuth carboxylates; zirconium compounds or aluminum compounds such as zirconium chelates and aluminum chelates; dialkyltin dicarboxylates such as dibutyltin dilaurate and dibutyltin acetate; tertiary amines; and, the stannous salts of carboxylic acids such as stannous octoate and stannous acetate.

In the second step of Synthetic Process 1, the isocyanate-terminated prepolymer of general Formula (3) is reacted with silane(s) possessing at least one active hydrogen functional group to provide silyl group-containing polymer (ii). Useful silanes are represented by general Formula (4):

$$HY^1-R^2-SiX^1X^2X^3 \quad (4)$$

wherein $R^2$, $X^1$, $X^2$ and $X^3$ have the aforestated meanings and each occurrence of $Y^1$ is independently selected from the group consisting of oxygen (—O—), sulfur (—S—), (—)$_2$NR$^3$, —NR$^3$(C=O)NR$^3$—, —NR$^3$(C=O)O— and —NR$^3$(C=O)S—, wherein $R^3$ is hydrogen, alkyl, alkenyl, arenyl, aralkyl or an —R$^2$SiX$^1$X$^2$X$^3$ group, wherein each $R^3$, other than hydrogen, contains up to 18 carbon atoms.

The silylation reaction herein is well known in the art, e.g., from U.S. Pat. Nos. 5,990,257 and 6,197,912, the entire contents of which are incorporated by reference herein.

In one embodiment of the present invention, the active hydrogen organofunctional silanes include, e.g., primary and secondary amino-alkoxysilanes, ureidoalkoxysilane, carbamatosilane, thiocarbamatosilane, mercaptoalkoxysilanes and hydroxyl-alkoxysilanes. Representative examples of suitable silanes include N-phenyl-3-aminopropyltrimethoxysilane, N-methyl-3-aminopropyltrimethoxysilane, N-butyl-3-aminopropyltrimethoxy silane, 4-amino-3,3-dimethylbutyltrimethoxysilane, N-cyclohexyl-3-aminopropyltrimethoxysilane, dibutyl maleate adduct of 3-aminopropyltrimethoxy silane, dibutyl maleate adduct of 4-amino-3,3-dimethylbutyltrimethoxysilane, 3-aminopropyltrimethoxysilane, bis-(3-trimethoxysilylpropyl)amine, 3-aminopropylmethyldimethoxysilane, 3-aminopropyldimethyl(methylethyloximato)silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltrimethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)propyltrimethoxysilane, N-ethyl-4-amino-3,3 dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, 3-mercaptopropyltrimethoxysilane, 3-mercaptopropyltriethoxysilane, 3-mercaptopropylmethyldimethoxysilane, 3-ureidopropyltrimethoxysilane, 3-ureidopropylmethyldimethoxysilane and O-(3-trimethoyxsilylpropyl)carbamate.

Synthetic Process 2: Isocyanate-Terminated
Prepolymer of Formula (3) is Reacted with an
Ethylenically Unsaturated Compound Containing an
Active Hydrogen Functional Group to Introduce
Ethylenic Unsaturation into the Prepolymer which is
then Reacted with a Silane Containing an Si—H
Group to Provide Silyl Group-Containing Polymer
(ii)

In the first step of Synthetic Process 2, at least one isocyanate-terminated prepolymer of general Formula (3) as described above is reacted with at least one unsaturated compound containing an active hydrogen functional group as represented by general Formula (5):

(5)

wherein each occurrence of $R^4$ is a divalent hydrocarbyl group of up to 10 carbon atoms selected from the group consisting of divalent alkylene, alkenylene, arenylene, arylene and aralkylene optionally containing one or more oxygen and/or nitrogen atoms; each occurrence of $R^5$ is independently hydrogen or a monovalent hydrocarbyl of up to 9 carbon atoms selected from the group consisting of alkyl, arenyl, aryl and aralkyl, with the proviso that the sum of carbon atoms in $R^4$ and $R^5$ does not exceed 10; and, each occurrence of $Y^2$ is independently selected from the group consisting of oxygen (—O—), a substituted nitrogen, (—)$_2$NR$^3$, —NR$^3$(C=O)NR$^3$—, and —NR$^3$(C=O)O— wherein $R^3$ is hydrogen, alkyl, alkenyl, arenyl, aralkyl or an —R$^2$SiX$^1$X$^2$X$^3$ group wherein each $R^3$, other than hydrogen, contains up to 18 carbon atoms.

The resulting intermediate containing at least one ethylenically unsaturated group may be represented by general Formula (6):

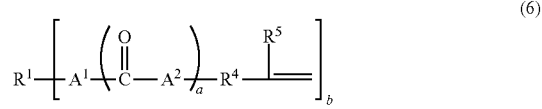

(6)

wherein $R^1$, $R^4$, $R^5$ and b have the aforestated meanings and each occurrence of $A^1$ and $A^2$ is independently selected from oxygen or substituted nitrogen of the structure (—)$_2$NR$^3$ where $R^3$ is hydrogen, alkyl, alkenyl, aryl aralkyl or the group —R$^2$SiX$^1$X$^2$X$^3$ wherein each $R^3$, other than hydrogen, contains up to 18 carbon atoms, and with the proviso that when $A^1$ is oxygen, $A^2$ is (—)$_2$NR$^3$ and a is 1.

The reaction conditions that can be used to form the ethylenically unsaturated prepolymer of Formula (6) can include the use of any of the catalysts mentioned above for the preparation of the isocyanate-terminated prepolymer, reduced, ambient or elevated temperature, the use of aprotic solvent and reduced, atmospheric or high pressure. Suitable temperatures range from 0 to 150° C., preferably from 25 to 100° C. and more preferably from 60 to 90° C. Suitable pressures range from 0.1 mmHg to 10 bars, preferably from 10 mmHg to 2 bars and more preferably from 600 mmHg to 1 bar. Representative non-limiting examples of typical aprotic solvents include ethyl ether, tetrahydrofuran, ethyl acetate, toluene, hexanes and cyclohexanes.

In the second step of Synthetic Process 2, ethylenically unsaturated prepolymer(s) of Formula (6) is hydrosilated with at least one silane containing an Si—H group, i.e., a hydridosilane, of general Formula (7):

$$HSiX^1X^2X^3 \qquad (7)$$

wherein $X^1$, $X^2$ and $X^3$ have the aforestated meanings. Since typical hydrosilation catalysts are poisoned by sulfur-containing materials, prepolymer(s) of Formula (6) and hydridosilane(s) (7) should both be free of sulfur atoms when such catalysts are utilized. Conditions for the hydrosilation of intermediates containing carbon-carbon double bonds are well known in the art, e.g., as described in "Comprehensive Handbook of Hydrosilylation," B. Marciniec (ed), Pergamon Press, New York (1992), the entire contents of which are incorporated by reference herein.

Useful hydridosilanes include H—Si(OCH$_3$)$_3$, H—Si(OCH$_2$CH$_3$)$_3$, H—SiCH$_3$(OCH$_3$)$_3$, H—SiCH$_3$(OCH$_2$CH$_3$)$_2$, H—Si(CH$_3$)$_2$OCH$_3$, H—Si(CH$_3$)$_2$OCH$_2$CH$_3$, and the like.

Synthetic Process 3: Reaction of a Polyol with a
Hydrolyzable Silane Containing an Isocyanate
Functional Group to Provide Silyl Group-Containing
Polymer (ii)

A hydroxyl-functional polyol such as any of those previously described is converted into silyl group-containing polymer (ii) by reaction with an isocyanate-functional silane, i.e., an isocyanatosilane, typically in the presence of a suitable catalyst, with less than an equivalent to slightly more than an equivalent of isocyanatosilane. In one embodiment, the —NCO to —OH ratio can range from 0.5 to 1.1, preferably from 0.8 to 1 and more preferably from 0.95 to 0.99. When the —NCO to —OH ratio is less than 1, polymer (ii) will possess residual hydroxyl groups which may be advantageous in some instances in improving adhesion to substrates and lowering the modulus of the cured resin.

Suitable isocyanatosilanes for preparing silyl group-containing polymer (ii) may be represented by general Formula (8):

$$OCN—R^2—SiX^1X^2X^3 \qquad (8)$$

wherein $X^1$, $X^2$ and $X^3$ have the aforestated meanings and $R^2$ is independently a divalent hydrocarbyl group containing up to 12 carbon atoms selected from the group consisting of divalent alkylene, alkenylene, arenylene, arylene and aralkylene optionally containing at least one heteroatom selected from the group consisting of oxygen and sulfur.

Specific examples of isocyanatosilanes of Formula (8) include 3-isocyanatopropyltrimethoxysilane, 3-isocyanatoisopropyltrimethoxysilane, 4-isocyanatobutyltrimethoxysilane, 2-isocyanato-1,1-dimethylethyltrimethoxysilane, 3-isocyanatopropyltriethoxysilane, 3-isocyanatoisopropyltriethoxysilane, 4-isocyanatobutyltriethoxysilane, 2-isocyanato-1,1-dimethylethyltriethoxysilane, 2-thiocyanatoethyltrimethoxysilane, 3-thiocyanatopropyltriethoxysilane, 3-isocyanatopropylmethyldimethoxysilane, 3-isocyanatoisopropyldimethylmethoxysilane, 4-isocyanatobutylphenyldimethoxysilane, 2-(4-isocyanatophenyl)ethylmethyldimethoxysilane, and the like.

Synthetic Process 4: Polyol is Reacted with
Ethylenically Unsaturated Halide to Provide
Ethylentically Unsaturated Prepolymer which is then
Reacted with a Hydridosilane to Provide Silyl
Group-Containing Polymer (ii)

In the first step of Synthetic Process 4, polyol such as any of those previously described is converted into an ethylenically unsaturated prepolymer, e.g., by reaction with less than an equivalent amount of ethylenically unsaturated halide(s), typically in the presence of a suitable catalyst. The resulting ethylenically unsaturated prepolymer may be represented by general Formula (9):

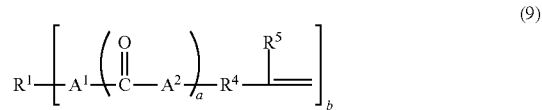

$$R^1 \!-\!\!\left[\!A^1\!-\!\!\left(\!\!\overset{O}{\underset{\|}{C}}\!-\!A^2\!\right)_{\!a}\!\!-\!R^4\!-\!\!\overset{R^5}{\underset{|}{\;}}\!=\!\right]_{\!b} \qquad (9)$$

wherein $R^1$, $R^4$, $R^5$, $A^2$ and b have the aforestated meanings, $A^1$ is oxygen and a is 0.

The ethylenically unsaturated halide(s) used in the preparation of prepolymer of Formula 9 may be represented by general Formula (10):

$$Y^3\!-\!R^4\!\!\overset{R^5}{\underset{|}{\;}}\!= \qquad (10)$$

wherein $R^4$ and $R^5$ have the aforestated meanings and each occurrence of $Y^3$ is independently a halo atom selected from the group consisting of Cl—, Br— and I—. The conditions for this reaction are well known in the art, e.g., as disclosed in U.S. Pat. Nos. 3,951,888 and 3,971,751, the entire contents of which are incorporated by reference herein.

Representative non-limiting examples of ethylenically unsaturated halides of Formula (10) include allyl chloride, allyl bromide, allyl iodide, methallyl chloride, methallyl bromide, 6-hexenyl chloride, chloromethylstyrene, and the like.

In the second step of Synthetic Process 4, ethylenically unsaturated prepolymer of Formula (9) is hydrosilated with at least one hydridosilane of Formula (7), supra, specific examples of which can be any of those previously mentioned. As noted above, since hydrosilation catalysts are poisoned by sulfur-containing materials, ethylenically unsaturated prepolymer (9) should be free of sulfur atoms when using such catalysts. Conditions for conducting the foregoing hydrosilation reaction are well known in the art, e.g., as described in previously cited "Comprehensive Handbook of Hydrosilylation," B. Marciniec (ed), Pergamon Press, New York (1992).

In silyl group-containing polymer (ii) of Formula (1), $R^1$ can be, e.g., a polymer fragment having a number average molecular weight of from 500 to 25,000 grams per mole, preferably from 1,000 to 20,000 grams per mole and more preferably from 4,000 to 12,000 grams per mole and a Tg of from −20 to −80° C., preferably from −25 to 40° C. and more preferably from −30 to −35° C.; $R^2$ can be an alkylene or arylene of up to 6 carbon atoms, preferably from 1 to 3 carbon atoms and more preferably 3 carbon atoms; $A^1$ can be oxygen or substituted nitrogen of the structure (—)$_2$NR$^3$ wherein R$^3$ is hydrogen, alkyl or aryl wherein each R$^3$, other than hydrogen, contains up to 10 carbon atoms and preferably from 1 to 6 carbon atoms; A$^2$ can be substituted nitrogen of the structure (—)$_2$NR$^3$ wherein R$^3$ is hydrogen, alkyl or aryl wherein each R$^3$, other than hydrogen, contains up to 10 carbon atoms and preferably from 1 to 6 carbon atoms; X$^1$ and X$^2$ can be methoxy, ethoxy or propoxy; and, X$^3$ can be methyl, methoxy, ethoxy or propoxy.

In other embodiments, silyl group-containing polymer (ii) can be prepared from a hydroxyl-containing acrylate polymer containing at least one hydrolyzable silyl group that is bonded to the acrylic polymer fragment through a carbonyl linking group which is bonded to heteroatoms of oxygen or nitrogen. These polymers are preferred for applications where high strength is required since the acrylate polymer fragment will impart high modulus to the cured resin. The silyl group-containing polymer(s) (ii) made from a hydroxyl-containing acrylate polymer may be represented by general Formula (11):

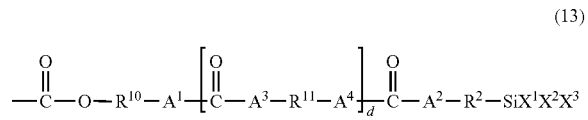

wherein:

each occurrence of R$^6$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of R$^7$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of R$^8$ is a covalent bond or divalent hydrocarbyl group of up to 12 carbon atoms selected from the group consisting of alkylene, arenylene, arylene and aralkylene optionally containing at least one heteroatom selected from the group consisting of oxygen, nitrogen and sulfur;

each occurrence of X$^5$ is independently an organofunctional group selected from the group consisting of carboxyl (—C(=O)OH), cyano (—CN), hydroxyl (—OH), halo (Cl—, Br— and I—), phenyl (—C$_6$H$_5$) and vinyl (—C(R$^5$)=CH$_2$) wherein R$^5$ has the aforestated meaning;

each occurrence of X$^6$ is independently a monovalent hydrocarbyl group containing an ester linking group, —C(=O)O—R$^9$, wherein each occurrence of R$^9$ is independently a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of X$^7$ is independently a monovalent hydrocarbyl group containing a hydroxyl and ester linking group, —C(=O)O—R$^{10}$—OH, wherein each occurrence of R$^{10}$ is independently a divalent hydrocarbylene group of up to 12 carbon atoms selected from the group consisting of alkylene, arenylene, arylene and aralkylene optionally containing at least one heteroatom selected from the group consisting of oxygen, nitrogen and sulfur;

each occurrence of X$^8$ is independently a monovalent hydrocarbyl group containing a hydrolyzable silyl group and a urethane linking group represented by general Formula (12):

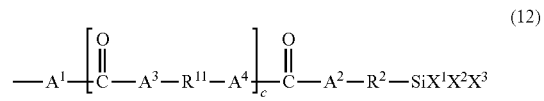

wherein R$^2$, X$^1$, X$^2$ and X$^3$ have the aforestated meanings; R$^{11}$ is a divalent hydrocarbylene group of up to 18 carbon atoms selected from the group consisting of alkylene, arenylene, arylene, and aralkylene optionally containing at least one heteroatom selected from the group consisting of oxygen, nitrogen and sulfur; A$^1$ is oxygen; A$^3$ and A$^4$ are —NH—, each A$^2$ is divalent oxygen, sulfur or substituted nitrogen of the structure (—)$_2$NR$^3$ wherein R$^3$ is hydrogen, alkyl, alkenyl, aryl aralkyl or an —R$^2$SiX$^1$X$^2$X$^3$ group wherein each R$^3$, other than hydrogen, contains up to 18 carbon atoms, and with the proviso that when c is 0, A$^2$ is —NH—;

each occurrence of X$^9$ is independently a monovalent hydrocarbonyl group containing a hydrolyzable silyl group, a urethane group and an ester linking group as represented by general Formula (13):

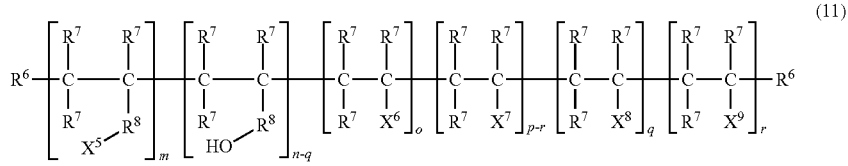

wherein R$^2$, R$^{11}$, X$^1$, X$^2$ and X$^3$ have the aforestated meanings; each occurrence of R$^{10}$ is a divalent hydrocarbyl group of up to 12 carbon atoms selected from the group consisting of alkylene, arenylene, arylene and aralkylene optionally containing at least one heteroatom selected from the group consisting of oxygen, nitrogen and sulfur; A$^1$ is oxygen; A$^3$ and A$^4$ are —NH—; each A$^2$ is divalent oxygen, sulfur or substituted nitrogen of the structure (—)$_2$NR$^3$ wherein R$^3$ is hydrogen, alkyl, alkenyl, aryl aralkyl or a —R$^2$SiX$^1$X$^2$X$^3$ group wherein each R$^3$, other than hydrogen, contains up to 18 carbon atoms, and with the proviso that when d is 0, A$^2$ is —NH—; and, each occurrence of c, d, m, n, o, p, q and r is an integer wherein c is 0 or 1; d is 0 or 1, m is 0 to 500, n is 0 to 500, o is 0 to 500 and p is 0 to 500, q is 0 to 500 and r is 0 to 500, with the proviso that the sum of q and r is greater than 1, q is less than or equal to n, and r is less than or equal to p.

In still other embodiments of the invention, in silyl group-containing polymer (ii) of Formula (11), R$^7$ is hydrogen or methyl and more preferably hydrogen; R$^8$ is a covalent bond; R$^9$ is an alkyl or aryl group of up to 10 carbon atoms, preferably from 2 to 8 carbon atoms and more preferably from 3 to 6 carbon atoms; $R^{10}$ is an alkylene group of up to 12 carbon atoms, preferably from 2 to 8 carbon atoms and more preferably from 3 to 6 carbon atoms; $X^5$ is phenyl, cyano, chloro or carboxyl (—C(C=O)OH); m is from 0 to 300, preferably from 10 to 100 and more preferably from 25 to 50; n is 0 to 300, preferably from 10 to 100 and more preferably from 25 to 50; o is 0 to 300, preferably from 10 to 100 and more preferably from 25 to 50; p is 0 to 300, preferably from 10 to 100 and more preferably from 25 to 50, q is 0 to 200, preferably from 1 to 100 and more preferably from 5 to 50; and, r is 0 to 200, preferably 1 to 100 and more preferably from 5 to 50, with the proviso that the sum of q and r is equal to or greater than 1.

Silyl group-containing polymer (ii) of Formula (11) can be prepared by any of several synthetic processes including the one hereinafter described.

Synthetic Process 5: Hydroxyl-Containing Acrylate Polymer is Reacted with Isocyanatosilane of Formula (8) to Provide Silyl Group-Containing Polymer (ii) of Formula (11)

According to one specific embodiment of the invention, a silyl group-containing polymer (ii) of Formula (11) is obtained by reacting at least one hydroxyl-containing acrylate polymer such as any of those aforementioned with at least one isocyanatosilane of Formula (8), the latter typically being present in the reaction medium in less than, equal to or slightly greater than a stoichometric amount. According to another embodiment, the —NCO to —OH ratio can range from 0.5 to 1.1, preferably from 0.8 to 1 and more preferably from 0.95 to 0.99. When the —NCO to —OH ratio is less than 1, polymer (ii) will possess residual hydroxyl groups which may be advantageous in some instances in improving adhesion of the cured resin to substrates and lowering its modulus.

According to one embodiment of the invention, the hydroxyl-containing acrylate polymer useful for making polymer (ii) possesses a Tg greater than 0° C., and in another embodiment greater than 10° C. The number average molecular weight of the hydroxyl-containing acrylic polymer can range from 1,000 to 50,000 grams per mole and preferably from 2,500 to 15,000 grams per mole. In one embodiment of the invention, the equivalent hydroxyl molecular weight of the hydroxyl-containing acrylic polymer can range from 200 to 2,000 grams per mole and preferably from 400 to 1,000 grams per mole.

Representative non-limiting examples of hydroxyl-containing acrylic polymer useful for making silyl group-containing polymer (ii) include G-Cure 114BL80, G-Cure 196BL80, G-Cure 192BL80, G-Cure 869PWF50 and G-Cure 109A75 (Cognis); Acryloid AU-608, Paraloid UCD 685HS, Paraloid AU 1166 and Paraloid AU 608S (Rohm & Haas); Acryflow A-90, Acryflow A140 and Acryflow M100 (Lyondell); and Acrylamac HS 232-2350, Acrylamac HS 232-2314 and Acrylamac HS 232-2365 (Hexion), and the like.

Combinations of different monomers can be used to prepare the hydroxyl-containing acrylate polymer(s) of Formula (2) to achieve a desired Tg in the cured resin compositions of the invention. The use of high Tg monomers tends to increase the modulus and hardness of the cured resin while the use of low Tg monomers tends to impart toughness and flexibility thereto.

Optionally, the silyl group-containing polymer (ii), especially those prepared from hydroxyl-containing acrylate polymers, can contain one or more solvents, e.g., in amounts of up to 40, and preferably up to 20, weight percent thereof. Solvent(s) can help to improve the compatibility of silyl group-containing polymer (ii) with thermoplastic polymer (i). Suitable non-limiting examples of solvents include n-butyl acetate, n-butyl acetate, methyl n-amyl ketone, methyl ethyl ketone, Dowanol PM (Dow Chemical Company), acetate, xylene, ethyl benzene, Aromatic Solvent 100 (Exxon Chemicals), HiSol 10 (Ashland Chemical Co.), toluene, Aliphatic Solvent 90 (Banner Chemicals Group), and the like.

Silane (iii) Possessing at Least One Reactive Carbon-Carbon Unsaturated Bond Silane (iii) possessing at least one reactive carbon-carbon unsaturated bond is capable of reacting with moisture (water) to form silanols (Si—OH) which then undergo condensation to form siloxane (Si—O—Si) bonds or reaction with hydroxyl groups present on inorganic surfaces, e.g., metals and metal alloys such as iron, steel and aluminum, silicas, glass, ceramics, etc., to form covalent silicon-oxygen surface bonds. The carbon-carbon unsaturated bond of silane(s) (iii) grafts onto thermoplastic polymer(s) (i) and silyl group-containing polymer(s) (ii) in the presence of at least one free radical-generating agent and under reactive-mechanical conditions.

Silane (iii) prior to its being grafted to polymers (i) and (ii) may be represented by general Formula (14):

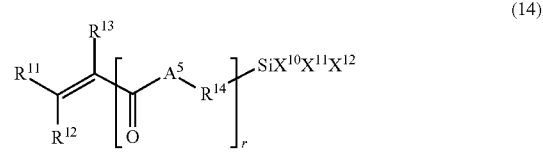

(14)

wherein:

each occurrence of $R^{11}$, $R^{12}$ and $R^{13}$ is independently hydrogen or a monovalent hydrocarbyl group containing up to 12 carbon atoms selected from the group consisting of alkyl, alkenyl, arenyl, aryl and aralkyl;

each occurrence of $R^{14}$ is independently a divalent hydrocarbylene group of up to 12 carbon atoms selected from the group consisting of alkylene, alkenylene, arenylene, arylene and aralkylene optionally containing at least one oxygen heteroatom;

each occurrence of $A^5$ is independently a chemical bond, divalent oxygen (—O—) or substituted nitrogen of the structure (—)$_2$NR$^{15}$ wherein $R^{15}$ is hydrogen, alkyl, arenyl, aryl, aralkyl or an —R$^{14}$SiX$^1$X$^2$X$^3$ group wherein each $R^{15}$, other than hydrogen, contains up to 12 carbon atoms;

each occurrence of $X^{10}$ is independently selected from the group consisting of RO—, RC(=O)O—, R$_2$C=NO— and R$_2$NO— wherein each R is independently hydrogen, alkyl, alkenyl, arenyl, aryl or aralkyl wherein each R, other than hydrogen, contains up to 18 carbon atoms and, optionally, at least one oxygen atom;

each occurrence of $X^{11}$ and $X^{12}$ is independently selected from the group consisting of RO—, RC(=O)O—, R$_2$C=NO—, R$_2$NO— and R wherein each R is independently hydrogen, alkyl, alkenyl, arenyl, aryl or aralkyl wherein each R, other than hydrogen, contains up to 18 carbon atoms and, optionally, at least one oxygen or sulfur atom; and, r is 0 or 1.

Some specific non-limiting examples of $R^{11}$, $R^{12}$ and $R^{13}$ include hydrogen; alkyls such as methyl, ethyl, propyl, isopropyl, butyl, hexyl, octyl, ethylcyclohexyl, norbornyl, cyclopentyl and cyclohexyl and preferably methyl or ethyl; aryls such as phenyl and naphthalenyl; aralkyls such as benzyl and phenethyl; and, arenyls such as tolyl and xylyl. The $R^{11}$, $R^{12}$ and $R^{13}$ groups herein do not contain any moiety capable of grafting onto polymer (i) and/or (iii), e.g., an unsaturated carbon-carbon bond. If $R^{11}$, $R^{12}$ or $R^{13}$ contained a moiety capable of grafting onto polymer (i) and/or (iii), then silane would have at least two reactive groups that would form bonds under the reactive-mechanical conditions and in the presence of at least one free radical-generating agent (iv), resulting in the premature crosslinking, often referred to as scorching, of the moisture-curable resin composition of the present invention.

Specific hydrolyzable silanes (iii) containing a reactive unsaturated carbon-carbon bond, e.g., as represented by Formula (14), that are suitable for use herein include 6-(methyl-dimethoxy-silanyl)-2-methyl-hex-1-en-3-one; 6-(trimethoxy-silanyl)-2-methyl-hex-1-en-3-one; 7-(methyl-dimethoxy-silanyl)-2,3-dimethyl-hept-2-en-4-one; 2-methyl-acrylic acid 2-(trimethoxy-silanyl)-ethyl ester; 2-methyl-acrylic acid 2-(methyl-dimethoxy-silanyl)-ethyl ester; 2-methyl-acrylic acid 3-(methyl-dimethoxy-silanyl)-propyl ester; 2-methyl-acrylic acid 3-(triethoxy-silanyl)-propyl ester; 2-methyl-acrylic acid 3-(phenyl-dimethoxy-silanyl)-propyl ester; N-[3-(methyl-dimethoxy-silanyl)-propyl]-2-methyl-acrylamide; N-[3-(triethoxy-silanyl)-propyl]-2-methyl-acrylamide; N-[1-(trimethoxy-silanyl)-methyl]-2-methyl-acrylamide; N-[3-(methyl-dimethoxy-silanyl)-propyl]-acrylamide; acrylic acid 3-(methyl-dimethoxy-silanyl)-propyl ester; acrylic acid 3-(trimethoxy-silanyl)-propyl ester; methyl-dimethoxy-vinyl-silane; trimethoxy-vinyl-silane; phenyl-dimethoxy-vinyl-silane; tripropoxy-vinyl-silane; methyl-diethoxy-vinyl-silane; triethoxy-vinyl-silane; and mixtures thereof.

Silane (iii) can be present in the moisture-curable, graft-modified resin-forming composition herein in an amount of from 0.1 to 10, and preferably from 1 to 5, weight percent based on the weight of the entire composition.

Free Radical-Generating Agent (iv)

Free radical-generating agent (iv) can be selected from among any of the known and conventional free radical generators such as azo compounds, peroxides, electron beam initiators, ultra-violet light initiators and shear-generated initiators that produce free radicals during mixing with components (i), (ii) and (iii) in step (c) of the process of the invention.

Included among the peroxide-type free radical-generating agents that are useful herein are those possessing a 0.1 hour half-life temperature of from 80° C. to 190° C., preferably from 90° C. to 155° C. and more preferably from 100° C. to 135° C. The specific peroxide 0.1 hour half life temperature(s) indicated herein are calculated using the data and formulae provided in the downloadable Arkema spreadsheet at the website address of www.arkema-inc.con/index.cfm?pag=353 by downloading the link which is highlighted as "Download Half-Life Selection Guide" on said web page and using the formula presented in the "Classical Plot" page in the Half-Life Selection Guide for the cell identified as the 6 minutes (0.1 hour) half-life, which is used with the data for Activation Energy (Ea (kcal/gmole)) and A constant (A(1/sec)) being provided for individual peroxides on the separate page in said Half Life Selection Guide entitled "Data and Configure." By utilizing the appropriate Activation Energy and A constant data for a particular peroxide in the formula, one will obtain a value for the 0.1 hour half-life temperature of the peroxide in the respective solvent indicated in the spreadsheet Data and Configure. The formula which was used for determining the preferably provided 0.1 hour half-life temperature of the peroxides herein is identified as the "Classical Plot" page in said Half-Life Selection Guide, for the cell identified as the 6 minutes (0.1 hour) half-life and is:

(Activation Energy/0.001987)/LN((A Constant multi-plied by 360)/0.693))−273.15.

It will also be understood herein that other conventionally known techniques for determining 0.1 hour half-life of a particular peroxide can be used to obtain a respective 0.1 hour half-life temperature of a respective peroxide. LN is understood to be natural logarithm.

Included among the azo-type free radical-generating agents that are useful herein are 2,2'-azobisisobutyronitrile, 2,2-azobis(2-methylpropionamidine) dihydrochloride, 1,1'azobis(cyclohexanecarbonitrile, 4,4'azobis(4-cyanovaleric acid). Specific non-limiting examples of peroxides include tert-butyl peroxypivalate, tert-butyl peroxy-2-ethylhexanoate, bis-(tert-butyl peroxy)cyclohexane, tert-butyl peroxy-3,5,5-trimethylhexanoate, tert-butyl peroxyacetate, di-tert-amyl peroxide, bis-(tert-butyl peroxyisopropyl)benzene, 2,5-dimethyl-2,5-di-(tert-butyl peroxy)hexane, tert-butyl peroxy acetate, di-tert-amyl peroxide, bis-(tert-butyl peroxyisopropyl)benzene, 2,5-dimethyl-2,5-bis-(tert-butyl peroxy)hexane, di-tert-butyl peroxide and mixtures thereof.

Free radical-generating agent (iv) will be incorporated in the moisture-curable, graft-modified resin-forming composition herein in an amount conducive to efficient grafting reaction(s), e.g., from 0.01 to 2, and preferably from 0.1 to 1, weight percent based on the weight of the entire composition.

Optional Component(s) (v)

Optional component(s) (v) that can be incorporated in the moisture-curable, graft-modified resin composition of this invention include such known and conventional materials as tackifying agents, fillers, ultra-violet stabilizers, antioxidants, catalysts, adhesion promoters, cure accelerators, rheology modifiers, corrosion inhibitors, hydrolyzable silicon compounds, flame retardants, waxes, moisture scavengers, pigments, dyes, surfactant, solvents, biocides, etc., employed in known and conventional amounts.

Optional component(s) (v) can be added to the moisture-curable, graft-modified resin composition herein at any suitable stage(s) in the manufacture thereof, e.g., blending with thermoplastic polymer(s) (i) prior to and/or during the heating of polymer(s) (i) to or above the melt temperature thereof in step (a), prior to, during and/or after combining molten thermoplastic polymer(s) (ii) and silyl-group containing polymer (ii) in step (b) and/or prior to, during and/or after the addition of silane(s) (iii) and/or free radical-generating agent(s) in step (c). When, e.g., optional component (v) is, or includes, a reactive tackifying agent, it is preferable to add the agent in either step (a) or step (b) so that the agent will be present during step (c) in which silane (iii) and free radical-generating agent (iv) are introduced under reactive-mechanical conditions to effect the grafting reaction(s).

Tackifying agents (v) are substances that may be added to adhesive compositions to improve their initial and extended tack range. A preferred group of tackifying agents are hydrocarbons containing from 6 to 10,000 carbon atoms, optionally containing at least one oxygen atom, and having a ring and ball softening point of from 70 to 120° C. and preferably from 80 to 100° C. Suitable tackifying agents herein are aliphatic, cycloaliphatic, aromatic, aliphatic-aromatic, aromatic-modified alicyclic and alicyclic hydrocarbon resins and hydrogenated derivatives thereof; terpenes, polyterpenes and modified terpenes such as phenolic-modified terpene resins and hydrogenated derivatives thereof; natural and modified rosin, hydrogenated rosin, dimerized rosin and polymerized rosin; rosin esters such as the glycerol and pentaerythritol esters of natural and modified rosins, glycerol esters of fatty organic acids, wood rosins, glycerol esters of hydrogenated rosin, glycerol esters of polymerized rosin, pentaerythritol esters of hydrogenated rosin and phenolic-modified pentaerythritol esters of rosin; alpha-methyl styrene resins and hydrogenated derivatives thereof; and, low molecular weight polylactic acid. Other useful tackifying agents are those disclosed in U.S. Pat. No. 6,355,317, the entire contents of which are incorporated by reference herein.

Representative non-limiting examples of specific tackifying resins that can be used herein include partially hydrogenated cycloaliphatic petroleum hydrocarbon resins available under the EASTOTAC series of trade designations such as EASTOTAC H-100, H-115, H-130 and H-142 in grades E, R, L and W which have differing levels of hydrogenation from least hydrogenated (E) to most hydrogenated (W) (Eastman Chemical Company), the ESCOREZ series of trade designations, such as ESCOREZ 5300 and ESCOREZ 5400 (Exxon Chemical Company), and the HERCOLITE 2100 trade designation (Hercules); partially hydrogenated aromatic modified petroleum hydrocarbon resins available under the ESCOREZ 5600 trade designation (Exxon Chemical Company); aliphatic-aromatic petroleum hydrocarbon resins available under the WINGTACK EXTRA trade designation (Goodyear Chemical Company); styrenated terpene resins made from d-limonene available under the ZONATAC 105 LITE trade designations (Arizona Chemical Company); and, aromatic hydrogenated hydrocarbon resins available under the REGAL-REZ 1094 trade designation (Hercules); and, alpha-methyl styrene resins available under the trade designations KRISTALEX 3070, 3085 and 3100 (Hercules).

For the moisture-curable, graft-modified resin compositions of the invention wherein thermoplastic polymer (i) is an ethylene vinyl acetate copolymer, the tackifying agent is preferably selected based upon the vinyl acetate content of the copolymer. For ethylene vinyl acetate copolymers having a vinyl acetate content of at least 28 weight percent, the tackifying agent is preferably an aromatic or aliphatic-resin having a ring and ball softening point of from 70 to 120° C.

When utilized, the selected tackifying resin(s) can be present in the moisture-curable resin composition of the invention in known and conventional amounts, e.g., from 1 to 60 and preferably from 5 to 30, weight percent of the entire composition.

Typical fillers suitable for inclusion in the moisture-curable, graft-modified resin composition of the present invention include, for example, reinforcing fillers such as fumed silica, precipitated silica, calcium carbonates, and the like. The moisture-curable resin composition of the present invention can include various thixotropic or anti-sagging agents. Various castor waxes, treated clays and polyamides typify this class of additives. Stabilizers that can be incorporated into the moisture-curable resin composition of this invention include, for example, hindered amine and dialkyldihydroxyamine. Adhesion promoters are useful in the moisture-curable composition of the present invention, e.g., alkoxysilane adhesion promoters. Suitable cure catalysts for timely curing (crosslinking) of the moisture-curable silylated polymer resin composition can be achieved with the use of various acids, bases, metal salts, and metal complexes of tin, titanium, zirconium and the like.

The moisture-curable, graft-modified resin composition of the present invention can include one or more components capable of inhibiting silane grafting and/or crosslinking during storage, e.g., free-radical inhibitor, free-radical stabilizer and/or free-radical scavenger. Some specific free-radical inhibitors are tris-2,4-di-tert-butylphenyl)phosphite, tris-[2,4-di-(1,1-dimethylpropyl)phenyl]phosphite, tris-(2-phenylphenyl)phosphite, tris (2-cyclohexylphenyl)phosphite; single 2,6-dialkylphenols such as 2,6-di-tert-butyl-4-methoxyphenol, 2,6-di-tert-butyl-4-methoxymethylphenol; bisphenols such as 2,2'-methylene-bis-(6-tert-butyl-4-methylphenol), 2,2'-methylene-bis-(6-tert-butyl-4-ethylphenol), 2,2'-methylene-bis-[4-methyl-6-(alpha-methylcyclohexyl)phenol], 1,1-bis-(5-tert-butyl-4-hydroxy-2-methylphenyl) butane, 2,2-bis-(3,5-tert-butyl-4-hydroxyphenyl)propane; and, hydroxyphenyl aromatics such as 1,3,5-tri-(3,5-di-tert-butyl-4-hydroxybenzyl)-2,4,6-trimethoxybenzene, dioctadecyl 2,2-bis-(3,5-di-tert-butyl-4-hydroxybenzyl)malonate, pentaerythrilyl [3-(3,5-di-tert-butyl-4-hydroxyphenyl)propionate], stearyl 3-(3,5-di-tert-butyl-4-hydroxyphenyl)propionate. Other free-radical inhibitors are those disclosed in U.S. Pat. No. 4,187,212 the entire contents of which are incorporated by reference herein. Some specific free-radical scavengers are pentaerythrilyl [3-(3,5-di-tert-butyl-4-hydroxyphenyl)propionate], stearyl 3-(3,5-di-tert-butyl-4-hydroxyphenyl)propionate and tris-2,4-di-tert-butylphenyl) phosphate. In one other embodiment herein, the compositions herein can further comprise moisture, which can be present as indicated herein.

A wide variety of materials which function as crosslinking catalysts for silanes are known in the art and any of such materials may be employed herein. Some non-limiting examples of crosslinking catalysts include metal carboxylates such as dibutyltin dilaurate, stannous acetate, stannous octanoate, lead naphthenate, zinc octanoate, iron-2-ethylhexanoate and cobalt naphthenate; organic metal compounds such as the titanium esters and chelates, for example tetrabutyl titanate, tetra-nonyl titanate and bis-(acetylacetonyl)diisopropyl titanate; organic bases such as ethylamine, hexylamine, dibutylamine and piperidine; and, acids such as mineral acids and fatty acids. Specific crosslinking catalysts are organic tin compounds such as dibutyltin dilaurate, dibutyltin diacetate and dibutyltin dioctanoate.

The moisture-curable, graft-modified resin composition of the present invention can include other additives typically employed for adhesive and sealant applications. These additives include solvents, pigments or other colorants, dyes, surfactant, fungicides and biocides. Such components may be employed in conventional amounts. Coating formulations would include additives as described for moisture-curable silylated polymer resin composition, though in different proportions than sealant or adhesive formulations, and typically include solvents and defoamers as examples.

Reactive-Mechanical Conditions

The expression "reactive mechanical-working conditions" herein shall be understood to mean the conditions within a mechanical working apparatus such as an extruder, high shear mixer, intermeshing mixer, tangential mixer, and the like, of elevated temperature and residence time sufficient to bring about reactive processing which includes activating the previously described free radical-generating agent(s) (iv) and bringing about the grafting of silane(s) (iii) onto the thermoplastic polymer(s) (i), silyl group-containing polymer(s) (ii) and if present, optional reactive tackifying agent(s).

In one embodiment in accordance with the process of this invention, the grafting reaction(s) between thermoplastic polymer(s) (i), silyl group-containing polymer(s) (ii), silane(s) (iii) and optional reactive tackifying agent to be achieved in step (c) of the process of the invention is/are carried out employing any suitable mechanical-working apparatus, e.g., a screw-type extruder, an internal Banbury mixer or a roll mill, provided, of course, the normal operation of the apparatus provides the desired grafting. A particularly advantageous mechanical-working apparatus is an extruder which effects a kneading or compounding action upon its contents. Such extruder apparatus may include such optional features as a heating jacket to augment the heat produced within the extruder barrel and a vacuum port whereby any unreacted silane and/or other volatile substances such as the decomposition products of a peroxide, alcohol, and the like, can be readily removed.

Silane (iii) can be introduced into the apparatus in which the reaction is to take place dispersed on the surface of thermoplastic polymer (i) or it can be metered directly into the apparatus. Free radical-generating agent (iv) can also be introduced by having been previously applied to the surface of thermoplastic polymer (i) and/or when feasible, dissolved in silane (iii). Silane (iii) and/or free radical-generating agent (iv) can be also introduced into the mechanical working apparatus as "dry" materials, i.e., at least a portion of silane (iii) and/or free radical-generating agent (iv), with or without one or more optional normally liquid materials (v), absorbed on one or more suitable mineral and/or organic particulate fillers or carriers such as dehydrated silica, calcium carbonate, carbon black, organic polymers, foamed polyolefins and the like. A dry free flowing composition comprises a silane (iii) in admixture with one or more of the aforestated carrier materials in a weight ratio of 0.1 to about 60 weight percent based upon the weight of the silane (iii) and carrier. The BET surface area of such carriers as silica can vary widely and in one embodiment can vary from 100 $m^2/g$ to 300 $m^2/g$. Porous carriers, such as foamed polyolefins can advantageously absorb from 10 ml to 250 ml per 100 grams (from 9 to 70 weight percent) of the silane (iii). The filler is essentially inert to the silane with which it is admixed as in the case with carbon black or organic polymers.

The reaction between thermoplastic polymer(s) (i), silyl group-containing polymer(s) (ii), silane(s) (iii) and any reactive optional component(s) (v), e.g., reactive tackifier(s), can be carried out at any suitable temperature between the melt temperature and degradation temperature of thermoplastic polymer(s) (i). The actual reaction temperature employed will normally be determined by such considerations as the type of mechanical working apparatus employed and where appropriate, on the power input to the apparatus and the compound viscosity profile. When the thermoplastic polymer is a polyolefin such as polyethylene, it is desirable to perform the grafting reaction at temperatures and for times similar to those commonly employed for the processing of polyolefins, e.g., the temperatures and times described herein.

While any known or conventional operation can be used to graft silane(s) (iii) onto thermoplastic polymer(s) (i), silyl group-containing polymer(s) (ii), and where present, optional reactive tackifying agent(s) (v), one particularly advantageous method involves blending in a reactive extruder thermoplastic polymer(s) (i) and optional reactive tackifying agent(s) (v) with silyl group-containing polymer(s) (ii) at a barrel temperature of at least 125° C., and then with free radical-generating agent(s) (iv) and silane(s) (iii), in the first stage of the extruder. The extruder can be a single screw extruder, e.g., one with a length/diameter (L/D) ratio of at least 25:1, preferably of at least 30:1 and more preferably of at least 38:1. The grafting conditions can vary greatly according to the formulation of a particular moisture-curable resin composition herein. Melt temperatures can range from 160° to 240° C., preferably from 210° to 230° C., and more preferably from 200° C. to 220° C., depending upon selected residence time and the type of free radical-generating agent (iv) utilized. Once the grafting reaction is complete, the moisture-curable resin composition of the present invention can be pelletized or extruded into a ribbon or other form and suitably stored for eventual application. For additional details relating to reactive extrusion equipment and its operation, reference may be made to G. H. Hu et al., "Reactive Modifiers for Polymers", first edition, Blackie Academic & Professional, an Imprint of Chapman & Hall, London 1997, Chapter 1, pages 1-97, the entire contents of which are incorporated by reference herein.

The moisture-curable, graft-modified resin composition of the invention can possess an open time of from 2 to 90, and preferably from 3 to 75, and, following moisture curing, a tensile strength of from 750 to 10,000 psi (5 MPa to 7 MPa) and preferably from 1,000 to 7,500 psi (7 MPa to 52 MPa), and a bond strength of from 70 to 1,000 lbf (311 N to 4,450 N) and preferably from 100 to 500 lbf (445 N to 2,225 N).

The moisture-curable, graft-modified resin composition of the invention, among its several uses, is especially advantageous for application as a moisture-cured adhesive for bonding two substrates to each other at their mutually opposed surfaces. Thus, in accordance with this aspect of the invention, there is provided a process for bonding substrates which comprises:

a) applying to a first substrate an adhesive bond-forming amount of the moisture-curable, graft-modified resin composition of the invention heated to the flowable state;

b) applying a second substrate to exposed surface of the moisture-curable, graft-modified resin composition while said resin composition is in the flowable state; and, c) moisture-curing the moisture-curable, graft-modified resin composition to provide a moisture-cured resin adhesively bonding the first substrate to the second substrate.

The first and second substrated can be fabricated from any of a wide variety of materials, e.g., metals and metal alloys, thermoplastics, thermosets, glass, ceramics, cements, stone, wood, cellulosics, composites and laminates of the foregoing, etc. The substrates can be formed from the same or different material, possess the same or different mechanical properties, have the same or different structural characteristics, dimensions, etc. It is especially advantageous to employ the moisture-curable, graft-modified resin composition herein for the bonding of substrates whose surfaces to be bonded to each other possess reactive functionalities, e.g., hydroxyl groups, that are present thereon and which will react with silanol groups produced by the resin composition during curing thereby forming covalent bonds that serve to chemically anchor the cured resin to the bonded substrate surfaces and increase bond strength. In one embodiment of the invention, coated or uncoated aluminum sheets or panels whose surfaces are to be joined together, e.g., to form a lap joint as in the construction of a vehicular trailer, possess hydroxyl groups that will react with silanol groups of the graft-modified resin composition as the latter undergoes moisture-curing thereby achieving even greater bond strengths than those obtainable with substrates whose surfaces to be bonded are essentially devoid of surface reactive functionalities.

Of the following examples, Examples 1-49 are illustrative of the invention and Comparative Examples 1-8 are presented for comparison purposes. In the compositional data presented in the tables, infra, all amounts of components are in grams.

EXAMPLE 1

A silyl group-containing polymer (ii) was prepared by charging Acclaim 4200 (280 grams, 0.07 mole), a low unsaturation poly(oxypropylene) diol having a number average molecular weight of 4,000 grams/mole and a hydroxyl number of 27.9 (Bayer), and PolyTHF Polyether (120 grams, 0.06 mole) a polytetrahydrofuran having a number average molecular weight of 2,000 grams/mole and a hydroxyl number of 55.4 (BASF) to a resin kettle and with agitation, sparging with nitrogen at 80° C. until the moisture content was reduced to 200 ppm or less. The temperature of the kettle was then cooled to 45±5° C. upon the addition of 4,4'-diphenyl methane diisocyanate, Mondur M (45.1 grams, 0.18 mole; Bayer). The catalyst, dibutyltindilaurate, Fomrez SUL-4 (5.5 ppm based upon tin; Chemtura Co.), was added 5 minutes later. The mixture was then heated to, and maintained at, 75±5° C. while stirring under a nitrogen blanket for the condensation reaction. The NCO content was measured using the n-dibutylamine titration method and monitored approximately every 0.5 hrs. After reaching an NCO content of 0.97 percent, N-ethyl-3-amino-2-methylpropyltrimethoxysilane, Silquest A-Link 15 (24.36 grams, 0.11 mole; Momentive Performance Materials) was added and the reaction continued at the same temperature until completion as determined by titration.

EXAMPLE 2

A silyl group-containing polymer (ii) was prepared by charging a poly(oxypropylene) diol, PPG 1000 (200 grams, 0.20 mole and a hydroxyl number of 112.4; Arcol), to a resin kettle and with agitation, sparging with nitrogen at 80° C. until the moisture content was reduced to 200 ppm or less. The temperature of the kettle was then cooled to 45±5° C. upon the addition of 4,4'-diphenyl methane diisocyanate, Mondur M (100.2 grams, 0.40 mole). The catalyst, Fomrez SUL-4 (5.5 ppm based upon tin), was added 5 minutes later. The mixture was then heated to, and maintained at, 75±5° C. while stirring under a nitrogen blanket for the condensation reaction. The NCO content was measured using the n-dibutylamine titration method and was monitored approximately every 0.5 hrs. After reaching an NCO content of 5.04 percent, N-ethyl-3-amino-2-methylpropyltrimethoxysilane, Silquest A-Link 15 (93.0 grams, 0.42 mole) was added to the mixture at 63° C. and the reaction continued at the same temperature until completion as determined by titration. The viscosity of the resulting polymer (ii) was 250,000 cps at 25° C.

EXAMPLE 3

A silyl group-containing polymer (ii) was prepared by charging PPG 1000 (200 grams, 0.20 mole) to a resin kettle and with agitation, sparging with nitrogen at 80° C. until the moisture content was reduced to 200 ppm or less. The temperature of the kettle was then cooled to 45±5° C. upon the addition of 4,4'-diphenyl methane diisocyanate, Mondur M (100.2 grams, 0.40 moles; Bayer). The catalyst, Fomrez SUL-4 (5.5 ppm based upon tin), was added 5 minutes later. The mixture was then heated to, and was maintained at, 75±5° C. while stirring under a nitrogen blanket for the condensation reaction. The NCO content was checked using the n-dibutylamine titration method and was monitored approximately every 0.5 hrs. After reaching an NCO content of 5.61 percent, N-ethyl-3-amino-2-methylpropyltrimethoxysilane, Silquest A-Link 15 (93.0 grams, 0.42 mole), was added to the mixture at 63° C. and the reaction continued at the same temperature until completion as determined by titration.

EXAMPLE 4

A silyl group-containing polymer (ii) was prepared by charging Acclaim 8200 (280 grams, 0.035 mole) and Poly-THF Polyether (120 grams, 0.06 mole) to a resin kettle and with agitation, sparging with nitrogen at 80° C. until the moisture content was reduced to 200 ppm or less. The temperature of the kettle was then cooled to 45±5° C. upon the addition of 4,4'-diphenyl methane diisocyanate, Mondur M, (33.1 grams, 0.133 mole). The catalyst, Fomrez SUL-4, was added 5 minutes later. The mixture was then heated to, and maintained at, 75±5° C. while stirring under a nitrogen blanket for the condensation reaction. The NCO content was measured using the n-dibutylamine titration method and was monitored approximately every 0.5 hrs. After reaching an NCO content of 0.73 percent, N-ethyl-3-amino-2-methylpropyltrimethoxysilane, Silquest A-Link 15 (17.8 grams, 0.08 mole), was added and the reaction continued at the same temperature until completion as determined by titration. The viscosity of the resulting polymer (ii) was 390,000 cps at 25° C.

EXAMPLE 5

A silyl group-containing polymer (ii) was prepared by charging to a three-neck reaction kettle hydroxyl-containing acrylic polymer G-Cure 114LB80 (400 grams, 0.42 mole of equivalent OH group; Cognis), 3-isocyanatopropyltriethoxysilane, Silquest A-Link 25 (54.66 grams, 0.22 mol; Momentive Performance Materials) and COSCAT 83 (0.125 ml; Caschem), heating the contents of the kettle to 80° C. and maintaining this temperature for four hours under a nitrogen blanket. The resulting silyl group-containing acrylic polymer (ii) was free of any detectable isocyanate (—NCO) as determined by titration and had a viscosity of 67,470 cps at 25° C.

EXAMPLE 6

A silyl group-containing polymer (ii) was prepared by charging to a three-neck reaction kettle, hydroxyl containing acrylic polymer G-Cure 114LB80 (1200 grams, 1.27 mole of equivalent OH group, Cognis), 3-isocyanatopropyltriethoxysilane, Silquest A-Link 25 (164 grams, 0.66 mol) and COSCAT 83 (0.125 ml), heating the contents of the kettle to 80° C. and maintaining this temperature for five hours under a nitrogen blanket, and then adding Irganox 1135 (6.8 grams). The resulting silyl group-containing acrylic polymer was free of any detectable isocyanate (—NCO) as determined by titration and had a viscosity of 24,715 cps at 25° C.

EXAMPLE 7

A silyl group-containing polymer (ii) was prepared by charging Stepanpol* PH-56 (280 grams, 0.145 mole, hydroxyl number of 57.4; Stepan) and PolyTHF 2000 Polyether (120 grams, 0.06 moles, hydroxyl number of 56.4; BASF) to a resin kettle and with agitation and sparging with nitrogen heating the contents of the kettle at 80° C. until the moisture content was reduced to 200 ppm or less. The temperature of the kettle was then cooled to 45±5° C. upon the addition of Desmodur W (85.4 grams, 0.325 mole; Bayer). The catalyst, Fomrez SUL-4 (5.5 ppm based upon tin), was added 5 minutes later. The mixture was then heated to, and maintained at, 75±5° C. while stirring under a nitrogen blanket for the condensation reaction. The NCO content was measured using the n-dibutylamine titration method and was monitored approximately every 0.5 hrs. After reaching an NCO content of 2.11 percent, N-ethyl-3-amino-2-methylpropyltrimethoxysilane, Silquest A-Link 15 (57.16 grams, 0.25 mole), was added and the reactions continued at the same temperature until completion as determined by titration. The viscosity of the resulting silyl group-containing polymer (ii) was 125,000 cps at 25° C.

EXAMPLES 8-14

Comparative Examples 1-3

Examples 8-14 illustrate the preparation of moisture-curable resin compositions in accordance with the invention for comparison with the single component hot melt adhesive resin compositions of Comparative Examples 1-3.

Thermoplastic polymer (i), tackifying agent and free radical stabilizer were mixed in a mixing bowl roller blade mixer for 15-30 minutes at a temperature of 170° C. at a rotor speed of 120 revolutions per minute (RPM). The mixing bowl was connected to a Brabender Plasticorder. When well blended, silyl group-containing polymer (ii) was added and mixed for 15-30 minutes. Silane (iii) and free radical-generating agent (iv) were then added and mixed for 15-30 minutes at 170° C. and rotor speed of 120 RPM. Other optional ingredients, if any, were added at this time.

The formulations of the adhesive-forming resin compositions of Examples 8-14 and Comparative Examples 1-3 are presented in Table 1 and physical properties of the adhesives obtained therefrom are presented in Table 2.

Thermoplastic polymer (i), Escorene Polyvinylacetate UL 7710 (ExxonMobil Chemical Company), has a melt index of 420 grams per 10 minutes, a density of 0.941 g/cm$^3$, a vinyl acetate content of 26.7 weight percent and a tensile at break of 232 psi. The tackifying agents, Escorez 2394, an aromatic modified aliphatic resin, and Escorez 1304, an aliphatic hydrocarbon resin (both ExxonMobil Chemical Company), have softening points of 9° C. and 100° C., respectively.

The data in Table 2 show significant improvement in tensile strength and lap shear strength resulting from the presence of silane (iii) and free radical-generating agent (iv) in the curable composition of the present invention (Examples 8-14).

TABLE 1

Adhesive-forming Resin Compositions of Examples 8-14 and Comparative Examples 1-3

| Components | Ex. 8 | Ex. 9 | Ex. 10 | Ex. 11 | Ex. 12 | Ex. 13 | Ex. 14 | Comp. Ex. 1 | Comp. Ex. 2 | Comp. Ex. 3 |
|---|---|---|---|---|---|---|---|---|---|---|
| Silyl group-containing polymer (ii) of Ex. 1 | 34.8 | 34.7 | 34.6 | 34.5 | 34.5 | 34.4 | 34.3 | 49.9 | 0 | 35 |
| Thermoplastic polymer (i), Polyvinylacetate UL 7710 | 29.9 | 29.8 | 29.7 | 29.6 | 29.5 | 29.5 | 29.4 | 0 | 49.9 | 30.0 |
| Escorez 2394 | 33.1 | 33.0 | 33.0 | 32.9 | 32.8 | 32.7 | 32.6 | 47.4 | 47.4 | 33.1 |
| Escorez 1304 | 1.7 | 1.7 | 1.7 | 1.7 | 1.7 | 1.7 | 1.7 | 2.2 | 2.2 | 1.7 |
| Silane (iii), Silquest A-171 (vinyltrimethoxysilane) | 0.458 | 0.686 | 0.915 | 1.144 | 1.373 | 1.647 | 1.830 | 0 | 0 | 0 |
| Free radical generating agent (iv), Triganox 42S peroxide | 0.043 | 0.064 | 0.085 | 0.106 | 0.128 | 0.153 | 0.170 | 0 | 0 | 0 |
| Irganox 1010 | 0.2 | 0.2 | 0.2 | 0.2 | 0.2 | 0.2 | 0.2 | 0.2 | 0.2 | 0.2 |

TABLE 2

Physical Properties of Adhesives Obtained From the Adhesive-forming Resin Compositions of Examples 8-14 and Comparative Examples 1-3*

Resin Compositions of Table 1

| Property | Ex. 8 | Ex. 9 | Ex. 10 | Ex. 11 | Ex. 12 | Ex. 13 | Ex. 14 | Comp. Ex. 1 | Comp. Ex. 2 | Comp. Ex. 3 |
|---|---|---|---|---|---|---|---|---|---|---|
| Open time, seconds | 4 | 4 | 3 | 3 | 3 | 3 | 3 | — | 3 | 2 |
| Tensile stress, psi | 1276 | 3276 | 4200 | 3773 | 4829 | 5280 | 5302 | 55 | 768 | 1305 |
| Lap shear, lbf | 167 | 249 | 298 | 317 | 396 | 402 | 427 | 4 | 64 | 129 |
| Strain, % | 12.7 | 13.8 | 15.1 | 14.3 | 17.2 | 18.6 | 32 | 10.0 | 7.8 | 6.2 |
| Adhesive Failure Mode* | adh | coh | coh | coh | coh | coh | Adh | adh | adh | adh |
| Substrate* | Al-U | Al-U | Al-U | Al-U | Al-U | Al-U | Al-U | Al-U | Al-U | Al-U |

*In this and the other tables presenting data of physical properties which follow,
"Adh" indicates that the cured resin pulled away from the surface to give adhesive failures;
"coh" indicates that the cured resin tore away while still bonded to the surface of the substrate to give cohesive failure;
"Al-C" identifies a coated aluminium surface; and,
"Al-U" identifies an uncoated aluminium surface.

EXAMPLES 15-21

Comparative Example 4

The adhesive-forming resin compositions of Examples 15-21 and Comparative Example 4 were prepared as in Example 8. The formulations of the resin compositions are presented in Table 3 and physical properties of the adhesives obtained therefrom are presented in Table 4.

The data in Tables 3 and 4 show significant improvement in tensile strength and lap shear strength resulting from the presence of silane (iii) and free radical-generating agent (iv) in the moisture-curable resin compositions of the present invention (Examples 15-21).

EXAMPLES 22-28

Comparative Example 5

The adhesive-forming resin compositions of Examples 22-28 and Comparative Example 5 were prepared as in Example 8. The formulations of the resin compositions are presented in Table 5 and physical properties of the adhesives obtained therefrom are presented in Table 6.

The data in Tables 5 and 6 show significant improvement in tensile strength and lap shear strength resulting from the presence of silane (iii) and free radical-generating agent (iv) in the moisture-curable compositions of the present invention (Examples 22-28).

TABLE 3

Adhesive-forming Resin Compositions of Examples 15-21 and Comparative Example 4

| Components | Ex. 15 | Ex. 16 | Ex. 17 | Ex. 18 | Ex. 19 | Ex. 20 | Ex. 21 | Comp. Ex. 4 |
|---|---|---|---|---|---|---|---|---|
| Silyl group-containing polymer (ii) of Ex. 3 | 17.5 | 17.4 | 17.4 | 17.3 | 17.3 | 17.2 | 17.1 | 17.5 |
| Thermoplastic polymer (i), Polyvinylacetate UL 7710 | 14.7 | 14.7 | 14.7 | 14.6 | 14.6 | 14.6 | 14.8 | 15 |
| Escorez 2394 | 16.5 | 16.5 | 16.5 | 16.4 | 16.4 | 16.3 | 16.2 | 16.5 |
| Escorez 1304 | 0.87 | 0.87 | 0.87 | 0.87 | 0.87 | 0.86 | 0.86 | 0.87 |
| Silane (iii), Silquest A-171 | 0.275 | 0.366 | 0.458 | 0.595 | 0.732 | 0.824 | 0.915 | 0 |
| Free radical-generating agent (iv), Triganox 42S peroxide | 0.026 | 0.034 | 0.043 | 0.055 | 0.068 | 0.077 | 0.085 | 0 |
| Irganox 1010 | 0.1 | 0.1 | 0.1 | 0.1 | 0.1 | 0.1 | 0.1 | 0.1 |

TABLE 4

Physical Properties of Adhesives Obtained From the Adhesive-forming Resin Compositions of Examples 15-21 and Comparative Example 4

Resin compositions of Table 3

| Property | Ex. 15 | Ex. 16 | Ex. 17 | Ex. 18 | Ex. 19 | Ex. 20 | Ex. 21 | Comp. Ex. 4 |
|---|---|---|---|---|---|---|---|---|
| Open time, seconds | | 4 | 4 | 4 | 3 | 3 | 3 | 3 |
| Tensile stress, psi | 1886 | 2141 | 2506 | 3276 | 3634 | 3643 | 4200 | 1342 |
| Lap shear, lbf | 147 | 218 | 203 | 249 | 298 | 317 | 378 | 102 |
| Strain, % | 11.0 | 12.0 | 12.7 | 10.4 | 22.0 | 14.3 | 18.8 | 10.0 |
| Adhesive Failure Mode | Adh | adh | adh | coh | Coh | Coh | coh | Adh |
| Substrate | Al-C | Al-C | Al-C | Al-U | Al-U | Al-C | Al-U | Al-C |

TABLE 5

Adhesive-forming Resin Compositions of Examples 22-28 and Comparative Example 5

| Component | Ex. 22 | Ex. 23 | Ex. 24 | Ex. 25 | Ex. 26 | Ex. 27 | Ex. 28 | Comp. Ex. 5 |
|---|---|---|---|---|---|---|---|---|
| Silyl group-containing polymer (ii) of Ex. 2 | 17.5 | 17.4 | 17.4 | 17.3 | 17.3 | 17.2 | 17.1 | 17.5 |
| Thermoplastic polymer (i), Polyvinylacetate UL 7710 | 14.7 | 14.7 | 14.7 | 14.6 | 14.6 | 14.6 | 14.8 | 15 |
| Escorez 2394 | 16.5 | 16.5 | 16.5 | 16.4 | 16.4 | 16.3 | 16.2 | 16.5 |
| Escorez 1304 | 0.87 | 0.87 | 0.87 | 0.87 | 0.87 | 0.86 | 0.86 | 0.87 |
| Silane (iii), Silquest A-171 silane[1] | 0.275 | 0.366 | 0.458 | 0.595 | 0.732 | 0.824 | 0.915 | 0 |
| Free radical-generating agent (iv), Triganox 42S peroxide | 0.026 | 0.034 | 0.043 | 0.055 | 0.068 | 0.077 | 0.085 | 0 |
| Irganox 1010 | 0.1 | 0.1 | 0.1 | 0.1 | 0.1 | 0.1 | 0.1 | 0.1 |

TABLE 6

Physical Properties of Adhesives Obtained From the Adhesive-forming Resin Compositions of Examples 22-28 and Comparative Example 5

| | Resin Compositions of Table 5 | | | | | | | |
|---|---|---|---|---|---|---|---|---|
| Property | Ex. 22 | Ex. 23 | Ex. 24 | Ex. 25 | Ex. 26 | Ex. 27 | Ex. 28 | Comp. Ex. 5 |
| Open time, seconds | 2 | 4 | 4 | 4 | 4 | 3 | 3 | 3 |
| Tensile stress, psi | 1040 | 1173 | 1457 | 1308 | 1276 | 4102 | 1102 | 1010 |
| Lap shear, lbf | 90 | 97 | 109 | 135 | 148 | 263 | 145 | 88 |
| Strain, % | 11.4 | 6.7 | 12.7 | 25 | 35 | 45 | 11 | 6.8 |
| Adhesive Failure Mode | Adh | Adh | Adh | Adh | Coh | Adh | Coh | Coh |
| Substrate[3] | Al-C | Al-C | Al-C | Al-C | Al-U | Al-U | Al-U | Al-U |

EXAMPLES 29-35

Comparative Example 6

The adhesive-forming resin compositions of Examples 29-35 and Comparative Example 6 were prepared as in Example 8 above. The formulations of the resin compositions are presented in Table 7 and physical properties of the adhesives obtained therefrom are presented in Table 8.

The data in Tables 7 and 8 show significant improvement in tensile strength and lap shear strength resulting from the presence of silane (iii) and free radical-generating agent (iv) in the moisture-curable resin compositions of the present invention (Examples 29-35).

TABLE 7

Adhesive-forming Resin Compositions of Examples 29-35 and Comparative Example 6

| Components | Ex. 29 | Ex. 30 | Ex. 31 | Ex. 32 | Ex. 33 | Ex. 34 | Ex. 35 | Comp. Ex. 6 |
|---|---|---|---|---|---|---|---|---|
| Silyl group-containing polymer (ii) of Ex. 4 | 17.5 | 17.4 | 17.4 | 17.3 | 17.3 | 17.2 | 17.1 | 17.5 |
| Thermoplastic polymer (i), Polyvinylacetate UL 7710 | 14.7 | 14.7 | 14.7 | 14.6 | 14.6 | 14.6 | 14.8 | 15 |
| Escorez 2394 | 16.5 | 16.5 | 16.5 | 16.4 | 16.4 | 16.3 | 16.2 | 16.5 |
| Escorez 1304 | 0.87 | 0.87 | 0.87 | 0.87 | 0.87 | 0.86 | 0.86 | 0.87 |
| Silane (iii), Silquest A-171 | 0.275 | 0.366 | 0.458 | 0.595 | 0.732 | 0.824 | 0.915 | 0 |

TABLE 7-continued

Adhesive-forming Resin Compositions of Examples 29-35 and Comparative Example 6

| Components | Ex. 29 | Ex. 30 | Ex. 31 | Ex. 32 | Ex. 33 | Ex. 34 | Ex. 35 | Comp. Ex. 6 |
|---|---|---|---|---|---|---|---|---|
| Free radical-generating agent (iv), Triganox 42S peroxide | 0.026 | 0.034 | 0.043 | 0.055 | 0.068 | 0.077 | 0.085 | 0 |
| Irganox 1010 | 0.1 | 0.1 | 0.1 | 0.1 | 0.1 | 0.1 | 0.1 | 0.1 |

TABLE 8

Physical Properties of Adhesives Obtained from the Adhesive-forming Resin Compositions of Examples 29-35 and Comparative Example 6

Resin Compositions of Table 7

| Property | Ex. 29 | Ex. 30 | Ex. 31 | Ex. 32 | Ex. 33 | Ex. 34 | Ex. 35 | Comp. Ex. 6 |
|---|---|---|---|---|---|---|---|---|
| Open time, seconds | 2 | 4 | 4 | 4 | 4 | 3 | gelled | 3 |
| Tensile stress, psi | 963 | 1058 | 1305 | 1797 | 2574 | 2800 | — | 673 |
| Lap shear, lbf | 72 | 90 | 107 | 151 | 224 | 238 | — | 55 |
| Strain, % | 15 | 11.4 | 6.5 | 7.8 | 12.2 | 9.5 | 16.1 | — |
| Adhesive Failure Mode | Adh | Adh | Adh | Adh | Coh | Coh | Coh | — |
| Substrate[3] | Al-C | Al-C | Al-C | Al-C | Al-C | Al-C | Al-C | — |

EXAMPLES 36-42

Comparative Example 7

The adhesive-forming resin compositions of Examples 36-42 and Comparative Example 7 were prepared as in Example 8. The formulations of the resin compositions are presented in Table 9 and physical properties of the adhesives obtained therefrom are presented in Table 10.

The data in Tables 9 and 10 show significant improvement in tensile strength and lap shear strength as the levels of silane (iii) and free radical-generating agent (iv) are increased in the moisture-curable resin compositions of the present invention (Examples 36-42).

TABLE 9

Adhesive-forming Resin Compositions of Examples 36-42 and Comparative Example 7

| Components | Ex. 36 | Ex. 37 | Ex. 38 | Ex. 39 | Ex. 40 | Ex. 41 | Ex. 42 | Comp. Ex. 7 |
|---|---|---|---|---|---|---|---|---|
| Silyl group-containing polymer (ii) of Ex. 5 | 17.5 | 17.4 | 17.4 | 17.3 | 17.3 | 17.2 | 17.1 | 17.5 |
| Thermoplastic polymer (i), Polyvinylacetate UL 7710 | 14.7 | 14.7 | 14.7 | 14.6 | 14.6 | 14.6 | 14.8 | 15 |
| Escorez 2394 | 16.5 | 16.5 | 16.5 | 16.4 | 16.4 | 16.3 | 16.2 | 16.5 |
| Escorez 1304 | 0.87 | 0.87 | 0.87 | 0.87 | 0.87 | 0.86 | 0.86 | 0.87 |
| Silane (iii), Silquest A-171 | 0.275 | 0.366 | 0.458 | 0.595 | 0.732 | 0.824 | 0.915 | 0 |
| Free radical generating agent (iv), Triganox 42S peroxide | 0.026 | 0.034 | 0.043 | 0.055 | 0.068 | 0.077 | 0.085 | 0 |
| Irganox 1010 | 0.1 | 0.1 | 0.1 | 0.1 | 0.1 | 0.1 | 0.1 | 0.1 |

TABLE 10

Physical Properties of Adhesives Obtained From the Adhesive-forming Resin Compositions of Examples 36-42 and Comparative Example 7

| | Resin Compositions of Table 9 | | | | | | | |
|---|---|---|---|---|---|---|---|---|
| Property | Ex. 36 | Ex. 37 | Ex. 38 | Ex. 39 | Ex. 40 | Ex. 41 | Ex. 42 | Comp. Ex. 7 |
| Open time, seconds | 4 | 15 | 10 | 10 | 7 | 5 | 5 | 3 |
| Tensile stress, psi | 1094 | 1735 | 2154 | 2243 | 2052 | 2140 | 1847 | 324 |
| Lap shear, lbf | 84 | 151 | 181 | 184 | 206 | 215 | 220 | 25 |
| Strain, % | 11.4 | 24 | 35 | 31 | 38 | 16.1 | 51 | 15.0 |
| Adhesive Failure Mode | Adh | Adh | Adh | Coh | Coh | Coh | Coh | Adh |
| Substrate | Al-C | Al-C | Al-C | Al-C | Al-C | Al-C | Al-C | Al-C |

EXAMPLES 43-49

Comparative Example 8

The adhesive-forming resin compositions of Examples 43-49 and Comparative Example 8 were prepared as in Example 8. The formulations of the resin compositions are presented in Table 11 and physical properties of the adhesives obtained therefrom are presented in Table 12.

The data in Tables 11 and 12 show significant improvement in open time as the levels of silyl group-containing polymer (ii) are increase in the curable compositions of the present invention (Examples 43-49).

TABLE 11

Adhesive-forming Resin Compositions of Examples 43-49 and Comparative Example 8

| Components | Ex. 43 | Ex. 44 | Ex. 45 | Ex. 46 | Ex. 47 | Ex. 48 | Ex. 49 | Comp. Ex. 8 |
|---|---|---|---|---|---|---|---|---|
| Silyl group-containing polymer (ii) of Ex. 6 | 4 | 8 | 12 | 16 | 20 | 24 | 28 | 0 |
| Thermoplastic polymer (i), Polyvinylacetate UL 7710 | 43.7 | 42 | 39.6 | 37.5 | 35.2 | 33.6 | 31.5 | 46.4 |
| Escorez 2394 | 45.9 | 43.3 | 41.5 | 39.4 | 37.5 | 34.9 | 33.0 | 47.4 |
| Escorez 1304 | 4.2 | 4.5 | 4.7 | 4.9 | 5.1 | 5.3 | 5.4 | 4.0 |
| Silane (iii0, Silquest A-171 | 1.647 | 1.647 | 1.647 | 1.647 | 1.647 | 1.647 | 1.647 | 1.647 |
| Free radical-generating agent (iv), Triganox 42S peroxide | 0.153 | 0.153 | 0.153 | 0.153 | 0.153 | 0.153 | 0.153 | 0.153 |
| Irganox 1010 | 0.4 | 0.4 | 0.4 | 0.4 | 0.4 | 0.4 | 0.4 | 0.4 |

TABLE 12

Physical Properties of Adhesives Obtained From the Adhesive-forming Resin compositions of Examples 43-49 and Comparative Example 8

| | Resin Compositions of Table 11 | | | | | | | |
|---|---|---|---|---|---|---|---|---|
| Property | Ex. 43 | Ex. 44 | Ex. 45 | Ex. 46 | Ex. 47 | Ex. 48 | Ex. 49 | Comp. Ex. 8 |
| Open time, seconds | 15 | 30 | 45 | 64 | 70 | 70 | 75 | 3 |
| Tensile stress, psi | 7141 | 6049 | 4809 | 4059 | 4595 | 4123 | 5097 | 6541 |
| Lap shear, lbf | 420 | 412 | 390 | 375 | 360 | 335 | 255 | 438 |
| Strain, % | 22 | 19 | 31 | 22 | 13 | 17 | 18 | 18 |
| Adhesive Failure Mode | Coh | Coh | Coh | Coh | Coh | Coh | Coh | Adh |
| Substrate | Al-U | Al-U | Al-U | Al-U | Al-U | Al-U | Al-U | Al-U |

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

The invention claimed is:

1. A moisture-curable, graft-modified resin composition which comprises at least one thermoplastic polymer (i) and at least one silyl group-containing polymer (ii) possessing at least one hydrolyzable silyl group that is bonded to polymer (ii) through a linking group containing at least one heteroatom selected from the group consisting of oxygen and nitrogen, each of polymers (i) and (ii) further having free-radically grafted thereto at least one same or different silane (iii) which, prior to being grafted, possesses at least one reactive carbon-carbon unsaturated bond.

2. The moisture-curable, graft-modified resin composition of claim 1 wherein thermoplastic polymer (i) is an ethylene-vinyl acetate copolymer having a vinyl acetate content of from 10 to 60 weight percent.

3. The moisture-curable, graft-modified resin composition of claim 1 wherein the thermoplastic polymer (i) is an ethylene-vinyl acetate copolymer having a vinyl acetate content of from 18 to 50 weight percent.

4. The moisture-curable, graft-modified resin composition of claim 1 wherein silyl group-containing polymer (ii) is represented by general Formula (1):

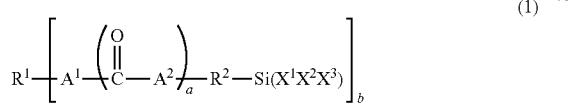

wherein:
each occurrence of $R^1$ is independently a monovalent or polyvalent organic polymer fragment having a number average molecular weight of from 500 to 25,000 grams/mole;
each occurrence of $R^2$ is independently a divalent hydrocarbyl group containing up to 12 carbon atoms selected from the group consisting of divalent alkylene, alkenylene, arenylene, arylene and aralkylene optionally containing at least one heteroatom selected from the group consisting of oxygen, nitrogen and sulfur;
each occurrence of $A^1$ is independently selected from divalent oxygen (—O—), sulfur (—S—) or substituted nitrogen of the structure $(—)_2NR^3$ wherein $R^3$ is hydrogen, alkyl, alkenyl, arenyl, aryl, aralkyl or an $—R^2SiX^1X^2X^3$ group wherein each $R^3$, other than hydrogen, contains up to 18 carbon atoms, and with the provisos that when a is 1 and $A^1$ is oxygen or sulfur, then $A^2$ is $(—)_2NR^3$ and when a is 0, then $A^1$ is oxygen;
each occurrence of $A^2$ is independently selected from divalent oxygen (—O—), sulfur (—S—) or substituted nitrogen of the structure $(—)_2NR^3$ wherein $R^3$ is hydrogen, alkyl, alkenyl, arenyl, aryl, aralkyl or $—R^2SiX^1X^2X^3$ group, wherein each $R^3$, other than hydrogen, contains up to 18 carbon atoms, and with the proviso that when $A^2$ is oxygen or sulfur, then $A^1$ is $(—)_2NR^3$;

each occurrence of $X^1$ is independently selected from the group consisting of RO—, RC(=O)O—, $R^2C=NO$— and $R_2NO$— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

each occurrence of $X^2$ and $X^3$ is independently selected from the group consisting of RO—, RC(=O)O—, $R_2C=NO$—, $R_2NO$— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms; and, each occurrence of subscripts a and b is independently an integer wherein a is 0 or 1 and b is 1 to 6.

5. The moisture-curable, graft-modified resin composition of claim 1 wherein silyl group containing polymer (ii) is an acrylic polymer represented by general Formula (11):

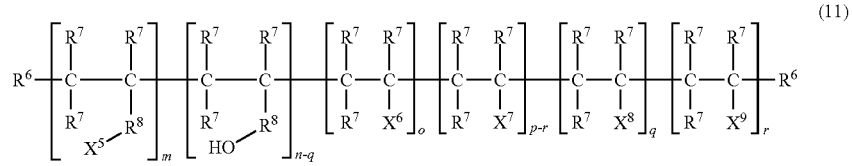

wherein:
each occurrence of $R^6$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;
each occurrence of $R^7$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;
each occurrence of $R^8$ is a covalent bond or divalent hydrocarbyl group of up to 12 carbon atoms selected from the group consisting of alkylene, arenylene, arylene and aralkylene optionally containing at least one heteroatom selected from the group consisting of oxygen, nitrogen and sulfur;
each occurrence of $X^5$ is independently an organofunctional group selected from the group consisting of carboxyl (—C(=O)OH), cyano (—CN), hydroxyl (—OH), halo (Cl—, Br— and I—), phenyl (—$C_6H_5$) and vinyl (—C($R^5$)=$CH_2$) wherein $R^5$ has the aforestated meaning;
each occurrence of $X^6$ is independently a monovalent hydrocarbyl group containing an ester linking group, —C(=O)O—$R^9$, wherein each occurrence of $R^9$ is independently a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of $X^7$ is independently a monovalent hydrocarbyl group containing a hydroxyl and ester linking group, $—C(=O)O—R^{10}—OH$, wherein each occurrence of $R^{10}$ is independently a divalent hydrocarbylene group of up to 12 carbon atoms selected from the group consisting of alkylene, arenylene, arylene and aralkylene optionally containing at least one heteroatom selected from the group consisting of oxygen, nitrogen and sulfur;

each occurrence of $X^8$ is independently a monovalent hydrocarbyl group containing a hydrolyzable silyl group and a urethane linking group represented by general Formula (12):

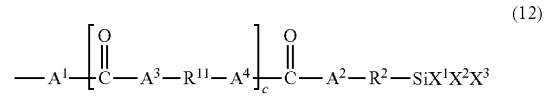

(12)

wherein $R^2$ is a divalent hydrocarbyl group containing up to 12 carbon atoms selected from the group consisting of divalent alkylene, alkenylene, arenylene, arylene and aralkylene optionally containing at least one heteroatom selected from the group consisting of oxygen, nitrogen and sulfur;

$X^1$ is selected from the group consisting of RO—, $RC(=O)O—$, $R_2C=NO—$ and $R_2NO—$ wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

$X^2$ and $X^3$ is independently selected from the group consisting of RO—, $RC(=O)O—$, $R_2C=NO—$, $R_2NO—$ and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

$R^{11}$ is a divalent hydrocarbylene group of up to 18 carbon atoms selected from the group consisting of alkylene, arenylene, arylene, and aralkylene optionally containing at least one heteroatom selected from the group consisting of oxygen, nitrogen and sulfur, $A^1$ is oxygen;

$A^3$ and $A^4$ are —NH—, each $A^2$ is divalent oxygen, sulfur or substituted nitrogen of the structure $(—)_2NR^3$ wherein $R^3$ is hydrogen, alkyl, alkenyl, aryl aralkyl or an $—R^2SiX^1X^2X^3$ group wherein each $R^3$, other than hydrogen, contains up to 18 carbon atoms, and with the proviso that when c is 0, $A^2$ is —NH—;

each occurrence of $X^9$ is independently a monovalent hydrocarbyl group containing a hydrolyzable silyl group, a urethane group and an ester linking group as represented by general Formula (13):

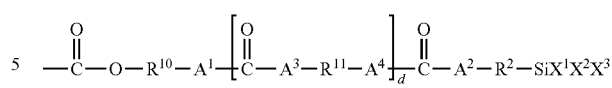

(13)

wherein $R^2$, $R^{11}$, $X^1$, $X^2$ and $X^3$ have the aforestated meanings;

each occurrence of $R^{10}$ is a divalent hydrocarbyl group of up to 12 carbon atoms selected from the group consisting of alkylene, arenylene, arylene and aralkylene optionally containing at least one heteroatom selected from the group consisting of oxygen, nitrogen and sulfur;

$A^1$ is oxygen;

$A^3$ and $A^4$ are —NH—;

each $A^2$ is divalent oxygen, sulfur or substituted nitrogen of the structure $(—)_2NR^3$ wherein $R^3$ is hydrogen, alkyl, alkenyl, aryl aralkyl or a $—R^2SiX^1X^2X^3$ group wherein each $R^3$, other than hydrogen, contains up to 18 carbon atoms, and with the proviso that when d is 0, $A^2$ is —NH—; and, each occurrence of c, d, m, n, o, p, q and r is an integer wherein c is 0 or 1; d is 0 or 1, m is 0 to 500, n is 0 to 500, o is 0 to 500 and p is 0 to 500, q is 0 to 500 and r is 0 to 500, with the proviso that the sum of q and r is greater than 1, q is less than or equal to n, and r is less than or equal to p.

6. The moisture-curable, graft-modified resin composition of claim 5 wherein in silyl group-containing-acrylic polymer (ii), $R^7$ is hydrogen or methyl;

$R^8$ is a covalent bond;

$R^9$ is an alkyl or aryl group of up to 10 carbon atoms;

$R^{10}$ is an alkylene group of up to 12 carbon atoms;

$X^5$ is phenyl, cyano, chloro or carboxyl (—C(C=O)OH);

m is from 0 to 300;

n is from 0 to 300;

o is from 0 to 300;

q is from 0 to 200; and, r is from 0 to 200, with the proviso that the sum of q and r is greater than 1.

7. The moisture-curable, graft-modified resin composition of claim 6 wherein in silyl group-containing acrylic polymer (ii), $R^7$ is hydrogen;

$R^9$ is an alkyl or aryl group of up to 8 carbon atoms;

$R^{10}$ is an alkylene group of up to 8 carbon atoms;

m is from 10 to 100;

n is from 10 to 100;

o is from 10 to 100;

q is from 1 to 100; and, r is from 1 to 100.

8. The moisture-curable, graft-modified resin composition of claim 7 wherein in silyl group-containing acrylate polymer (ii), $R^9$ is an alkyl or aryl group of up to 6 carbon atoms;

$R^{10}$ is an alkylene group of from 3 to 6 carbon atoms;

m is from 25 to 50;

n is from 25 to 50;

o is from 25 to 50;

p is from 25 to 50;

q is from 5 to 50; and, r is from 5 to 50.

9. The moisture-curable, graft-modified resin composition of claim 1 wherein silane (iii) prior to being grafted to polymers (i) and (ii) is represented by general Formula (14):

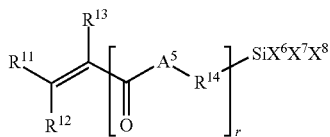
(14)

wherein:
- each occurrence of $R^{11}$, $R^{12}$ and $R^{13}$ is independently hydrogen or a monovalent hydrocarbyl group containing up to 12 carbon atoms selected from the group consisting of alkyl, alkenyl, arenyl, aryl and aralkyl;
- each occurrence of $R^{14}$ is independently a divalent hydrocarbylene group of up to 12 carbon atoms selected from the group consisting of alkylene, alkenylene, arenylene, arylene and aralkylene optionally containing at least one oxygen heteroatom;
- each occurrence of $A^5$ is independently a chemical bond, divalent oxygen (—O—) or substituted nitrogen of the structure (—)$_2$$NR^{15}$ wherein $R^{15}$ is hydrogen, alkyl, arenyl, aryl, aralkyl or an —$R^{14}SiX^1X^2X^3$ group wherein each $R^{15}$, other than hydrogen, contains up to 12 carbon atoms;
- each occurrence of $X^1$ is independently selected from the group consisting of RO—, RC(=O)O—, $R_2C$=NO— and $R_2NO$— wherein each R is independently hydrogen, alkyl, alkenyl, arenyl, aryl or aralkyl wherein each R, other than hydrogen, contains up to 18 carbon atoms and, optionally, at least one oxygen atom;
- each occurrence of $X^2$ and $X^3$ is independently selected from the group consisting of RO—, RC(=O )O—, $R_2C$=NO—, $R_2NO$— and R wherein each R is independently hydrogen, alkyl, alkenyl, arenyl, aryl or aralkyl wherein each R, other than hydrogen, contains up to 18 carbon atoms and, optionally, at least one oxygen or sulfur atom;
- each occurrence of $X^{10}$ is independently selected from the group consisting of RO—, RC(=O )O—, $R_2C$=NO— and $R_2NO$— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;
- each occurrence of $X^{11}$ and $X^{12}$ is independently selected from the group consisting of RO—, RC(=O)O—, $R_2C$=NO—, $R_2NO$— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms; and,
- r is 0 or 1.

10. The moisture-curable, graft-modified resin composition of claim 9 wherein silane (iii) is at least one member selected from the group consisting of
6-(methyl-dimethoxy-silanyl)-2-methyl-hex-1-en-3-one;
6-(trimethoxy-silanyl)-2-methyl-hex-1-en-3-one;
7-(methyl-dimethoxy-silanyl)-2,3-dimethyl-hept-2-en-4-one;
2-methyl-acrylic acid 2-(trimethoxy-silanyl)-ethyl ester;
2-methyl-acrylic acid 2-(methyl-dimethoxy-silanyl)-ethyl ester;
2-methyl-acrylic acid 3-(methyl-dimethoxy-silanyl)-propyl ester;
2-methyl-acrylic acid 3-(triethoxy-silanyl)-propyl ester;
2-methyl-acrylic acid 3-(phenyl-dimethoxy-silanyl)-propyl ester;
N-[3-(methyl-dimethoxy-silanyl)-propyl]-2-methyl-acrylamide;
N-[3-(triethoxy-silanyl)-propyl]-2-methyl-acrylamide;
N-[1-(trimethoxy-silanyl)-methyl]-2-methyl-acrylamide;
N-[3-(methyl-dimethoxy-silanyl)-propyl]-acrylamide;
acrylic acid 3-(methyl-dimethoxy-silanyl)-propyl ester;
acrylic acid 3-(trimethoxy-silanyl)-propyl ester; methyl-dimethoxy-vinyl-silane;
trimethoxy-vinyl-silane;
phenyl-dimethoxy-vinyl-silane;
tripropoxy-vinyl-silane;
methyl-diethoxy-vinyl-silane; and,
triethoxy-vinyl-silane.

11. The moisture-curable, graft-modified resin composition of claim 1 further comprising at least one optional component (v) selected from the group consisting of tackifying agents, fillers, reinforcements, ultra-violet stabilizers, antioxidants, antiozonants, catalysts, adhesion promoters, cure accelerators, rheology modifiers, solvents, surfactants, corrosion inhibitors, hydrolyzable silicon compounds, flame retardants, waxes, moisture scavengers, pigments, dyes, colorants, surfactant, solvents, fungicides, biocides, free-radical inhibitors, free-radical stabilizers and free radical scavengers.

12. The moisture-curable, graft-modified resin composition of claim 1 possessing an open time of from 2 to 90 seconds, wherein the open time is the time which begins at the point when an adhesive is applied at ambient conditions to a first substrate until it is bonded to a second substrate.

13. The moisture-curable, graft-modified resin composition of claim 1 possessing an open time of from 3 to 75 seconds, wherein the open time is the time which begins at the point when an adhesive is applied at ambient conditions to a first substrate until it is bonded to a second substrate.

14. The moisture-cured resin obtained from the moisture curing of the moisture-curable, graft-modified resin composition of claim 1.

15. The moisture-cured resin of claim 14 possessing a tensile strength of from 750 to 10,000 psi and a bond strength of from 70 to 1000 lbf.

16. The moisture-cured resin of claim 14 possessing a tensile strength of from 1,000 to 7,500 psi and a bond strength of from 100 to 500 lbf.

17. A process for preparing a moisture-curable, graft-modified resin composition comprising:
free-radically grafting at least one same or different silane (iii) possessing at least one reactive carbon-carbon unsaturated bond onto at least one thermoplastic polymer (i) and at least one silyl group-containing polymer (ii) possessing at least one hydrolyzable silyl group that is bonded to polymer (ii) through a linking group containing at least one heteroatom selected from the group consisting of oxygen and nitrogen, to provide a moisture-curable, graft-modified resin composition; and, optionally, moisture-curing the moisture-curable, graft-modified resin composition.

18. The process of claim 17 which comprises:
a) heating at least one thermoplastic polymer (i) to a temperature at or above the melt temperature but not exceeding the degradation temperature thereof to provide molten thermoplastic polymer(s)(i);
b) combining molten thermoplastic polymer(s)(i) from step (a) with at least one silyl group-containing polymer (ii) possessing at least one hydrolyzable silyl group that is bonded to polymer (ii) through a linking group containing at least one heteroatom selected from the group consisting of oxygen and nitrogen to provide a substantially uniform mixture of molten thermoplastic(s) (i) and silyl group-containing polymer(s) (ii);

c) combining the substantially uniform mixture of molten thermoplastic polymer(s) (i) and silyl group-containing polymer(s) (ii) from step (b) with at least one silane (iii) possessing at least one reactive carbon-carbon unsaturated bond, and at least one free radical-generating agent (iv) under reactive-mechanical conditions to provide a moisture-curable, graft-modified resin composition; and, d) optionally, moisture-curing the moisture-curable, graft-modified resin composition from step (c).

19. The process of claim 17 wherein thermoplastic resin (i) is an ethylene-vinyl acetate copolymer having a vinyl acetate content of from 10 to 60 weight percent.

20. The process of claim 17 wherein the thermoplastic resin (i) is an ethylene-vinyl acetate copolymer which has a vinyl acetate content of from 18 to 50 percent.

21. The process of claim 17 wherein silyl group-containing polymer (ii) is represented by general Formula (1):

$$R^1 \left[ A^1 \left( \overset{O}{\underset{\parallel}{C}} - A^2 \right)_a R^2 - Si(X^1 X^2 X^3) \right]_b \quad (1)$$

wherein:

each occurrence of $R^1$ is independently a monovalent or polyvalent organic polymer fragment having an number average molecular weight of from 500 to 25,000 grams/mole;

each occurrence of $R^2$ is independently a divalent hydrocarbyl group containing up to 12 carbon atoms selected from the group consisting of divalent alkylene, alkenylene, arenylene, arylene and aralkylene optionally containing at least one heteroatom selected from the group consisting of oxygen, nitrogen and sulfur;

each occurrence of $A^1$ is independently selected from divalent oxygen (—O—), sulfur (—S—) or substituted nitrogen of the structure (—)$_2$NR$^3$ wherein R$^3$ is hydrogen, alkyl, alkenyl, arenyl, aryl, aralkyl or an —R$^2$SiX$^1$X$^2$X$^3$ group wherein each R$^3$, other than hydrogen, contains up to 18 carbon atoms, and with the provisos that when a is 1 and A$^1$ is oxygen or sulfur, then A$^2$ is (—)$_2$NR$^3$ and when a is 0, then A$^1$ is oxygen;

each occurrence of A$^2$ is independently selected from divalent oxygen (—O—), sulfur (—S—) or substituted nitrogen of the structure (—)$_2$NR$^3$ wherein R$^3$ is hydrogen, alkyl, alkenyl, arenyl, aryl, aralkyl or —R$^2$SiX$^1$X$^2$X$^3$ group, wherein each R$^3$, other than hydrogen, contains up to 18 carbon atoms, and with the proviso that when A$^2$ is oxygen or sulfur, then A$^1$ is (—)$_2$NR$^3$;

each occurrence of X$^1$ is independently selected from the group consisting of RO—, RC(=O)O— and R$_2$NO— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

each occurrence of X$^2$ and X$^3$ is independently selected from the group consisting of RO—, RC(=O)O—, R$_2$C=NO—, R$_2$NO— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms; and, each occurrence of subscripts a and b is independently an integer wherein a is 0 or 1 and b is 1 to 6.

22. The process of claim 17 wherein silyl group containing polymer (ii) is an acrylic polymer represented by general Formula (11):

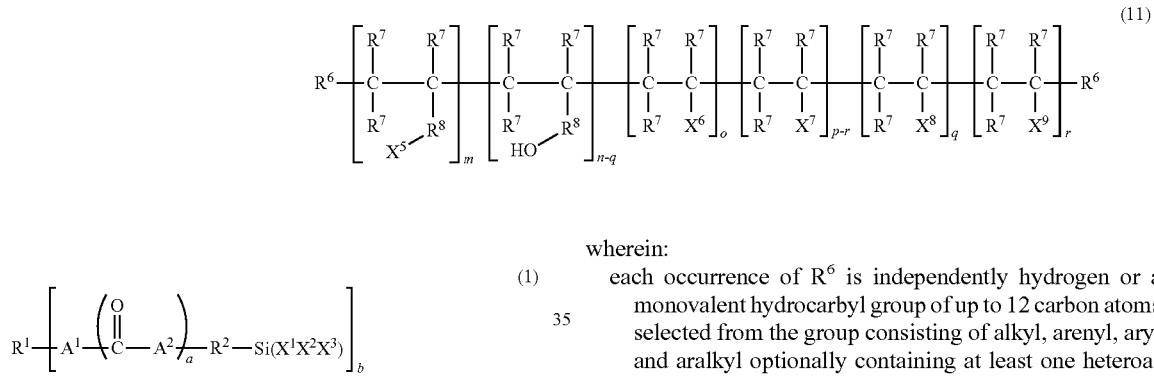

wherein:

each occurrence of R$^6$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of R$^7$ is independently hydrogen or a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of R$^8$ is a covalent bond or divalent hydrocarbyl group of up to 12 carbon atoms selected from the group consisting of alkylene, arenylene, arylene and aralkylene optionally containing at least one heteroatom selected from the group consisting of oxygen, nitrogen and sulfur;

each occurrence of X$^5$ is independently an organofunctional group selected from the group consisting of carboxyl (—C(=O)OH), cyano (—CN), hydroxyl (—OH), halo (Cl—, Br— and I—), phenyl (—C$_6$H$_5$) and vinyl (—C(R$^5$)=CH$_2$) wherein R$^5$ has the aforestated meaning;

each occurrence of X$^6$ is independently a monovalent hydrocarbyl group containing an ester linking group, —C(=O)O—R$^9$, wherein each occurrence of R$^9$ is independently a monovalent hydrocarbyl group of up to 12 carbon atoms selected from the group consisting of alkyl, arenyl, aryl and aralkyl optionally containing at least one heteroatom selected from the group consisting of oxygen, nitrogen and sulfur;

each occurrence of X$^7$ is independently a monovalent hydrocarbyl group containing a hydroxyl and ester linking group, —C(═O)O—R$^{10}$—OH, wherein each occurrence of R$^{10}$ is independently a divalent hydrocarbylene group of up to 12 carbon atoms selected from the group consisting of alkylene, arenylene, arylene and aralkylene optionally containing at least one heteroatom selected from the group consisting of oxygen, nitrogen and sulfur;

each occurrence of X$^8$ is independently a monovalent hydrocarbyl group containing a hydrolyzable silyl group and a urethane linking group represented by general Formula (12):

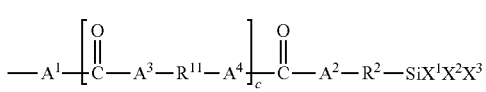

(12)

wherein

R$^2$ is a divalent hydrocarbyl group containing up to 12 carbon atoms selected from the group consisting of divalent alkylene, alkenylene, arenylene, arylene and aralkylene optionally containing at least one heteroatom selected from the group consisting of oxygen, nitrogen and sulfur;

X$^1$ is selected from the group consisting of RO—, RC(═O)O—, R$_2$C═NO— and R$_2$NO— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

X$^2$ and X$^3$ is independently selected from the group consisting of RO—, RC(═O )O—, R$_2$C═NO—, R$_2$NO— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

R$^{11}$ is a divalent hydrocarbylene group of up to 18 carbon atoms selected from the group consisting of alkylene, arenylene, arylene, and aralkylene optionally containing at least one heteroatom selected from the group consisting of oxygen, nitrogen and sulfur, A$^1$ is oxygen;

A$^3$ and A$^4$ are —NH—, each A$^2$ is divalent oxygen, sulfur or substituted nitrogen of the structure (—)$_2$NR$^3$ wherein R$^3$ is hydrogen, alkyl, alkenyl, aryl aralkyl or an —R$^2$SiX$^1$X$^2$X$^3$ group wherein each R$^3$, other than hydrogen, contains up to 18 carbon atoms, and with the proviso that when c is 0, A$^2$ is —NH—;

each occurrence of X$^9$ is independently a monovalent hydrocarbonyl group containing a hydrolyzable silyl group, a urethane group and an ester linking group as represented by general Formula (13):

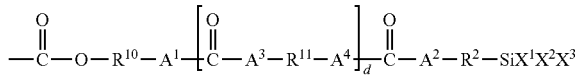

(13)

wherein

R$^2$, R$^{11}$, X$^1$, X$^2$ and X$^3$ have the aforestated meanings;

each occurrence of R$^{10}$ is a divalent hydrocarbyl group of up to 12 carbon atoms selected from the group consisting of alkylene, arenylene, arylene and aralkylene optionally containing at least one heteroatom selected from the group consisting of oxygen, nitrogen and sulfur;

A$^1$ is oxygen;

A$^3$ and A$^4$ are —NH—;

each A$^2$ is divalent oxygen, sulfur or substituted nitrogen of the structure (—)$_2$NR$^3$ wherein R$^3$ is hydrogen, alkyl, alkenyl, aryl aralkyl or a —R$^2$SiX$^1$X$^2$X$^3$ group wherein each R$^3$, other than hydrogen, contains up to 18 carbon atoms, and with the proviso that when d is 0, A$^2$ is —NH—; and, each occurrence of c, d, m, n, o, p, q and r is an integer wherein c is 0 or 1; d is 0 or 1, m is 0 to 500, n is 0 to 500, o is 0 to 500 and p is 0 to 500, q is 0 to 500 and r is 0 to 500, with the proviso that the sum of q and r is greater than or equal to 1, q is less than or equal to n, and r is less than or equal to p.

23. The process of claim 22 wherein in silyl group-containing-acrylic polymer (ii), R$^7$ is hydrogen or methyl; R$^8$ is a covalent bond; R$^9$ is an alkyl or aryl group of up to 10 carbon atoms; R$^{10}$ is an alkylene group of up to 12 carbon atoms; X$^5$ is phenyl, cyano, chloro or carboxyl (—C(C═O)OH); m is from 0 to 300; n is from 0 to 300; o is from 0 to 300; q is from 0 to 200; and, r is from 0 to 200, with the proviso that the sum of q and r is equal to or greater than 1.

24. The process of claim 23 wherein in silyl group-containing acrylic polymer (ii), R$^7$ is hydrogen; R$^9$ is an alkyl or aryl group of up to 8 carbon atoms; R$^{10}$ is an alkylene group of up to 8 carbon atoms; m is from 10 to 100; n is from 10 to 100; o is from 10 to 100; q is from 1 to 100; and, r is from 1 to 100.

25. The process of claim 24 wherein in silyl group-containing acrylate polymer (ii), R$^9$ is an alkyl or aryl group of up to 6 carbon atoms; R$^{10}$ is an alkylene group of from 3 to 6 carbon atoms; m is from 25 to 50; n is from 25 to 50; o is from 25 to 50; p is from 25 to 50; q is from 5 to 50; and, r is from 5 to 50.

26. The process of claim 17 wherein silane (iii) is represented by general Formula (14):

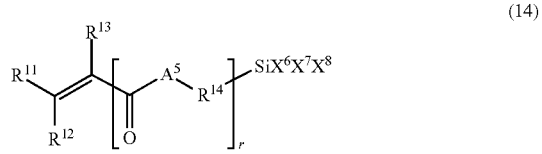

(14)

wherein:

each occurrence of R$_{11}$, R$^{12}$ and R$^{13}$ is independently hydrogen or a monovalent hydrocarbyl group containing up to 12 carbon atoms selected from the group consisting of alkyl, alkenyl, arenyl, aryl and aralkyl;

each occurrence of R$^{14}$ is independently a divalent hydrocarbylene group of up to 12 carbon atoms selected from the group consisting of alkylene, alkenylene, arenylene, arylene and aralkylene optionally containing at least one oxygen heteroatom;

each occurrence of A$^5$ is independently a chemical bond, divalent oxygen (—O—) or substituted nitrogen of the structure (—)$_2$NR$^{15}$ wherein R$^{15}$ is hydrogen, alkyl, arenyl, aryl, aralkyl or an —R$^{14}$SiX$^1$X$^2$X$^3$ group wherein each R$^{15}$, other than hydrogen, contains up to 12 carbon atoms;

each occurrence of X$^1$ is independently selected from the group consisting of RO—, RC(═O)O—, R$_2$C═NO— and R$_2$NO— wherein each R is independently hydrogen, alkyl, alkenyl, arenyl, aryl or aralkyl wherein each R, other than hydrogen, contains up to 18 carbon atoms and, optionally, at least one oxygen atom;

each occurrence of X$^2$ and X$^3$ is independently selected from the group consisting of RO—, RC(═O)O—, R$_2$C═NO—, R$_2$NO— and R wherein each R is independently hydrogen, alkyl, alkenyl, arenyl, aryl or aralkyl wherein each R, other than hydrogen, contains up to 18 carbon atoms and, optionally, at least one oxygen or sulfur atom;

each occurrence of X$^{10}$ is independently selected from the group consisting of RO—, RC(═O)O—, R$_2$C═NO— and R$_2$NO— wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms;

each occurrence of X$^{11}$ and X$^{12}$ is independently selected from the group consisting of RO—, RC(═O)O—, R$_2$C═NO—, R$_2$NO— and R wherein each R is independently selected from the group consisting of hydrogen, alkyl, alkenyl, arenyl, aryl, and aralkyl wherein each R, other than hydrogen, contains up to 18 carbon atoms and, optionally, one or more oxygen and/or sulfur atoms; and, r is 0 or 1.

27. The process of claim 26 wherein silane (iii) is at least one member selected from the group consisting of 6-(methyl-dimethoxy-silanyl)-2-methyl-hex-1-en-3-one;
6-(trimethoxy-silanyl)-2-methyl-hex-1-en-3-one;
7-(methyl-dimethoxy-silanyl)-2,3-dimethyl-hept-2-en-4-one;
2-methyl-acrylic acid 2-(trimethoxy-silanyl)-ethyl ester;
2-methyl-acrylic acid 2-(methyl-dimethoxy-silanyl)-ethyl ester;
2-methyl-acrylic acid 3-(methyl-dimethoxy-silanyl)-propyl ester;
2-methyl-acrylic acid 3-(triethoxy-silanyl)-propyl ester;
2-methyl-acrylic acid 3-(phenyl-dimethoxy-silanyl)-propyl ester;
N-[3-(methyl-dimethoxy-silanyl)-propyl]-2-methyl-acrylamide;
N-[3-(triethoxy-silanyl)-propyl]-2-methyl-acrylamide;
N-[1-(trimethoxy-silanyl)-methyl]-2-methyl-acrylamide;
N-[3-(methyl-dimethoxy-silanyl)-propyl]-acrylamide;
acrylic acid 3-(methyl-dimethoxy-silanyl)-propyl ester;
acrylic acid 3-(trimethoxy-silanyl)-propyl ester;
methyl-dimethoxy-vinyl-silane;
trimethoxy-vinyl-silane;
phenyl-dimethoxy-vinyl-silane;
tripropoxy-vinyl-silane;
methyl-diethoxy-vinyl-silane; and,
triethoxy-vinyl-silane.

28. The process of claim 18 further comprising adding at least one component (v) selected from the group consisting of tackifying agents, fillers, reinforcements, ultra-violet stabilizers, antioxidants, antiozonants, catalysts, adhesion promoters, cure accelerators, rheology modifiers, solvents, surfactants, corrosion inhibitors, hydrolyzable silicon compounds, flame retardants, waxes, moisture scavengers, pigments, dyes, colorants, surfactant, solvents, fungicides, biocides, free-radical inhibitors, free-radical stabilizers and free radical scavengers prior to, or following at least one of steps (a), (b) and (c).

29. A moisture-cured, graft-modified resin obtained from the moisture curing of the moisture-curable, graft-modified resin composition in accordance with the process of claim 17.

30. A moisture-curable, graft-modified resin-forming composition which comprises:
(i) at least one thermoplastic polymer;
(ii) at least one silyl group-containing polymer possessing at least one hydrolyzable silyl group that is bonded to the polymer through a linking group containing at least one heteroatom selected from the group consisting of oxygen and nitrogen;
(iii) at least one silane possessing at least one reactive carbon-carbon unsaturated bond;
(iv) at least one free radical-generating agent; and,
(v) optionally, one or more additional components.

31. The moisture-curable, graft-modified composition obtained from the grafting reactions of the moisture-curable, graft-modified resin-forming composition of claim 30, wherein the thermoplastic polymer (i) and the silyl group-containing polymer (ii) react with the silane (iii) under reactive-mechanical conditions.

32. A process for bonding substrates which comprises:
a) applying to a first substrate the moisture-curable, graft-modified resin composition of claim 1 heated to the flowable state;
b) applying a second substrate to exposed surface of the moisture-curable, graft-modified resin composition while said resin composition is in the flowable state; and,
c) moisture-curing the moisture-curable, graft-modified resin composition to provide a moisture-cured resin adhesively bonding the first substrate to the second substrate.

33. The process of claim 32 wherein the surface of the first substrate and/or second substrate to which the moisture-curable, graft-modified resin composition is applied possesses reactive functional groups for silanol groups.

34. The process of claim 33 wherein the first substrate and/or second substrate has a metal surface possessing hydroxyl groups.

35. The process of claim 34 wherein the metal surface is one of aluminum or aluminum alloy.

36. The bonded substrates obtained from the process of claim 32.

37. The bonded substrates obtained from the process of claim 33.

38. The bonded substrates obtained from the process of claim 34.

39. The bonded substrates obtained from the process of claim 35.

* * * * *